United States Patent
Matsumura

(10) Patent No.: US 8,203,917 B2
(45) Date of Patent: Jun. 19, 2012

(54) OPTICAL PICKUP APPARATUS, SIGNAL GENERATING METHOD, AND OPTICAL DISK APPARATUS

(75) Inventor: Yoshiyuki Matsumura, Anpachi-Gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 341 days.

(21) Appl. No.: 12/471,076

(22) Filed: May 22, 2009

(65) Prior Publication Data
US 2009/0296560 A1 Dec. 3, 2009

(30) Foreign Application Priority Data

May 27, 2008 (JP) .................................. 2008-138523
Aug. 19, 2008 (JP) .................................. 2008-211190

(51) Int. Cl.
*G11B 7/00* (2006.01)

(52) U.S. Cl. ...................... 369/44.24; 369/44.41; 369/94

(58) Field of Classification Search ......................... None
See application file for complete search history.

(56) References Cited

U.S. PATENT DOCUMENTS
4,766,582 A * 8/1988 Ando ........................ 369/44.24

FOREIGN PATENT DOCUMENTS
JP   2624255 B2   4/1997
JP   2006294075 A   10/2006
JP   2006344344 A   12/2006

* cited by examiner

*Primary Examiner* — Wayne Young
*Assistant Examiner* — Brian Butcher
(74) *Attorney, Agent, or Firm* — Ditthavong Mori & Steiner, P.C.

(57) ABSTRACT

An optical pickup apparatus is provided with an optical system for guiding a laser light emitted from a laser light source to an objective lens and also for guiding the laser light reflected by a recording medium to a photodetecting section as a convergent light. The photodetecting section is provided with first and second photodetectors disposed at positions at which a first part of the target laser light and a second part different from the first part are respectively received, the positions being separated further from the optical system than a convergence position of a target laser light reflected by an irradiation-target recording layer, out of the laser light reflected by the recording medium, and a third photodetector disposed at a position closer to the optical system than the convergence position of the target laser light, the position being bridging more over the second part than the first part.

6 Claims, 13 Drawing Sheets

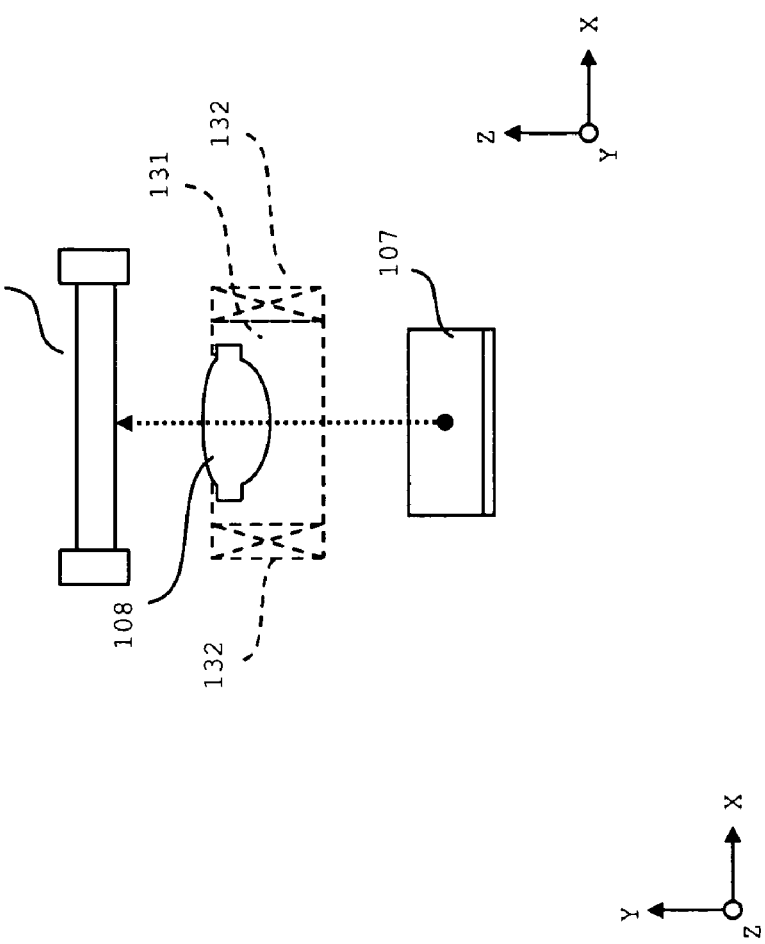
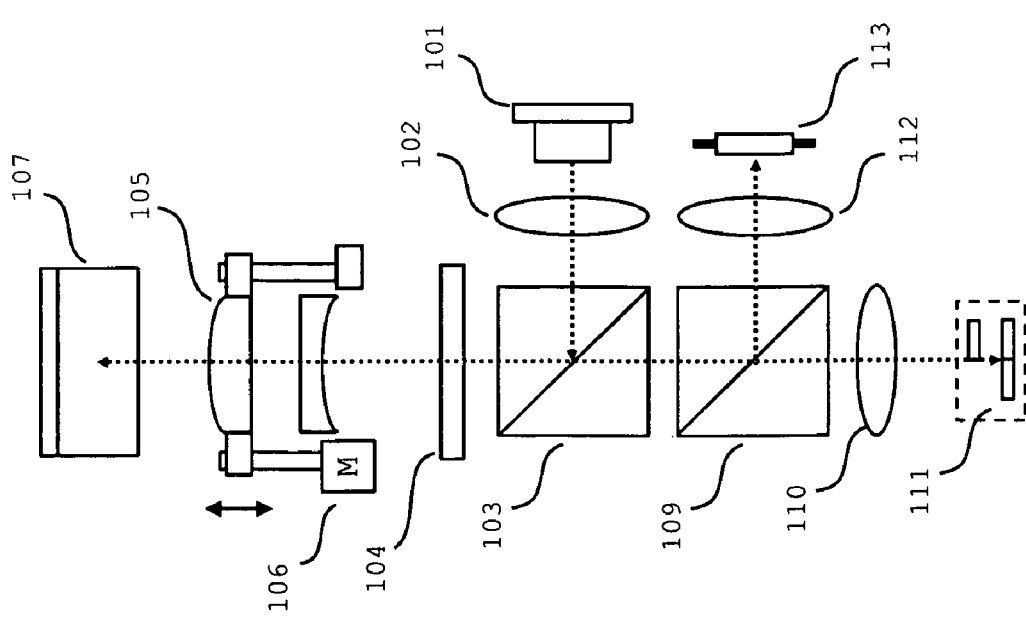
FIG. 1B
FIG. 1A

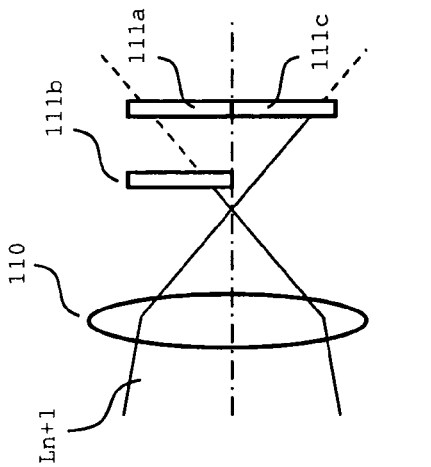
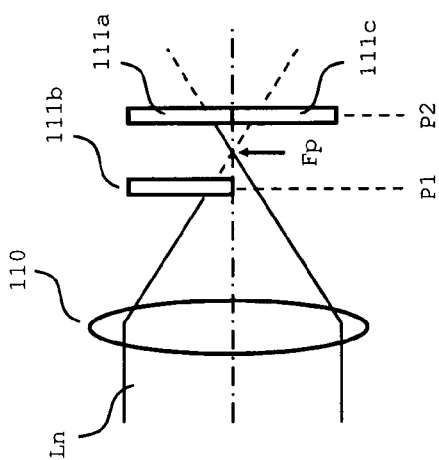
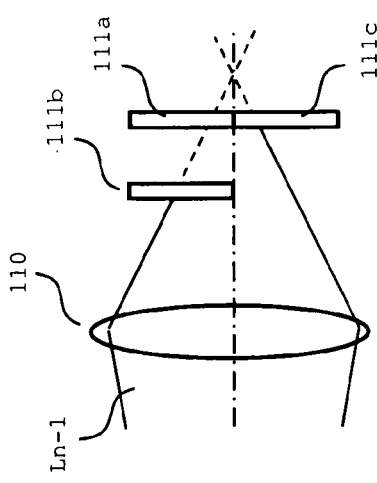
FIG.2A  FIG.2B  FIG.2C
CROSSTALK LIGHT FROM (n-1)TH LAYER
DETECTOR A=0
DETECTOR B=(Ln-1)/2
DETECTOR C=(Ln-1)/2
REPRODUCED LIGHT FROM n-TH LAYER
DETECTOR A=(Ln)/2
DETECTOR B=(Ln)/2
DETECTOR C=0
CROSSTALK LIGHT FROM (n+1)TH LAYER
DETECTOR A=0
DETECTOR B=(Ln+1)/2
DETECTOR C=(Ln+1)/2
  
DETECTOR A+DETECTOR B−DETECTOR C=Ln

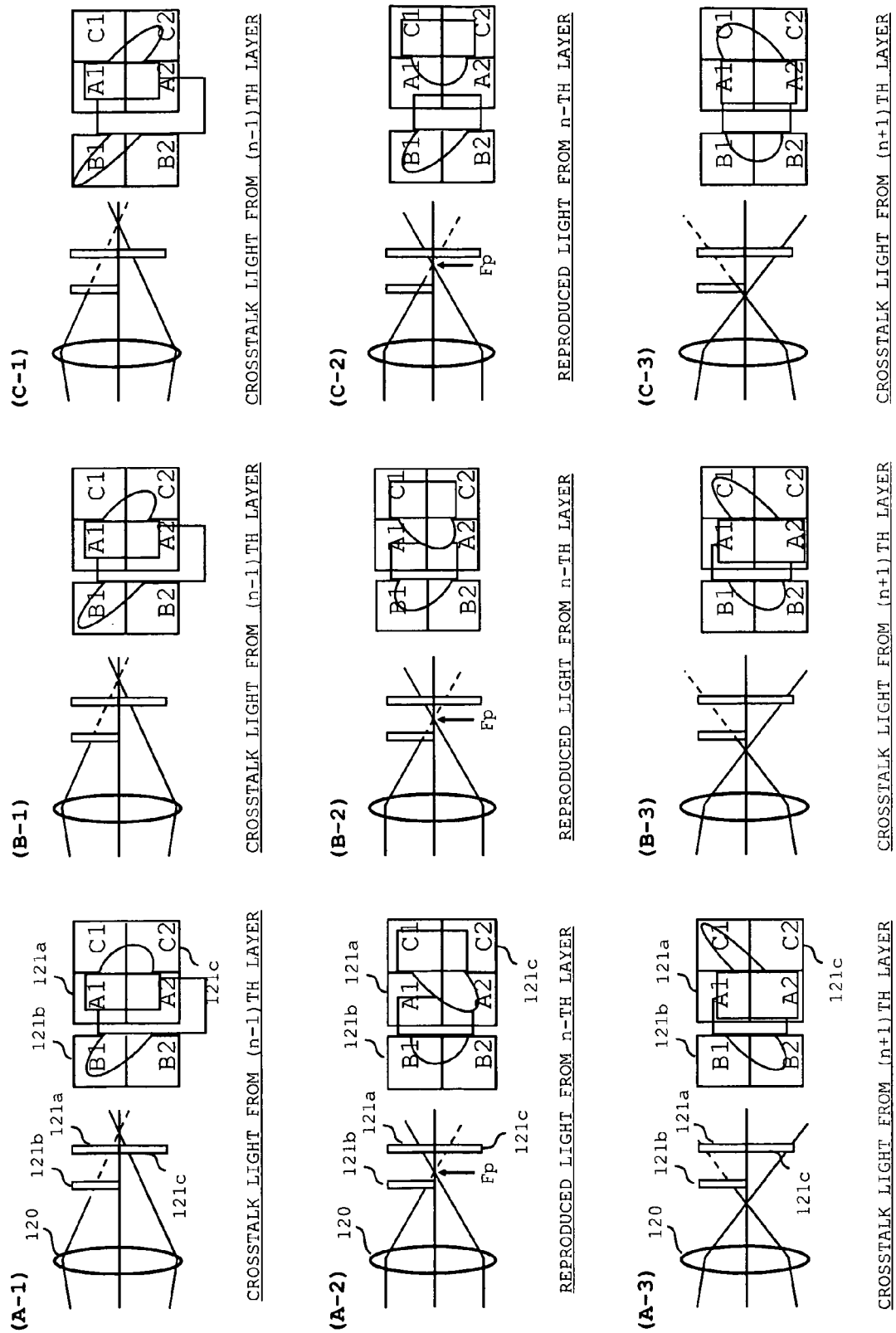

CROSSTALK LIGHT FROM (n-1)TH LAYER

DETECTOR A=ΔLn-1
DETECTOR B=(Ln-1)/2-(ΔLn-1)
DETECTOR C=(Ln-1)/2

REPRODUCED LIGHT FROM n-TH LAYER

DETECTOR A=(Ln)/2
DETECTOR B=(Ln)/2-(ΔLn)
DETECTOR C=ΔLn

CROSSTALK LIGHT FROM (n+1)TH LAYER

DETECTOR A=ΔLn+1
DETECTOR B=(Ln+1)/2-(ΔLn+1)
DETECTOR C=(Ln+1)/2

DETECTOR A+DETECTOR B−DETECTOR C=Ln−2ΔLn

CROSSTALK LIGHT FROM (n−1)TH LAYER

```
DETECTOR A=0
DETECTOR B=(Ln−1)/2+(ΔLn−1)
DETECTOR C=(Ln−1)/2−(ΔLn−1)
```

REPRODUCED LIGHT FROM n-TH LAYER

```
DETECTOR A=(Ln)/2−(ΔLn)
DETECTOR B=(Ln)/2+(ΔLn)
DETECTOR C=0
```

CROSSTALK LIGHT FROM (n+1)TH LAYER

```
DETECTOR A=0
DETECTOR B=(Ln+1)/2+(ΔLn+1)
DETECTOR C=(Ln+1)/2−(ΔLn+1)
```

DETECTOR A+DETECTOR B−DETECTOR C=Ln+2{(ΔLn−1)+(ΔLn+1)}

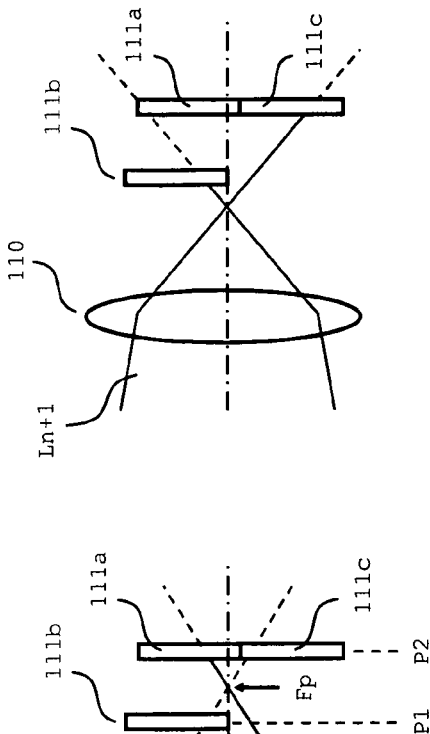
FIG.10A
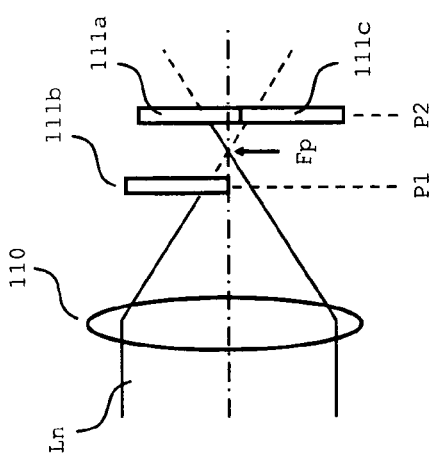
FIG.10B
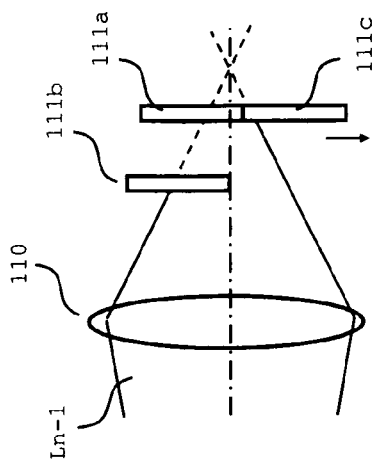
FIG.10C
CROSSTALK LIGHT FROM (n-1)TH LAYER
```
DETECTOR A=ΔLn-1
DETECTOR B=(Ln-1)/2
DETECTOR C=(Ln-1)/2-(ΔLn-1)
```
REPRODUCED LIGHT FROM n-TH LAYER
```
DETECTOR A=(Ln)/2
DETECTOR B=(Ln)/2
DETECTOR C=0
```
CROSSTALK LIGHT FROM (n+1)TH LAYER
```
DETECTOR A=ΔLn+1
DETECTOR B=(Ln+1)/2
DETECTOR C=(Ln+1)/2-(ΔLn+1)
```
DETECTOR A+DETECTOR B−DETECTOR C=Ln+2((ΔLn-1)+(ΔLn+1))

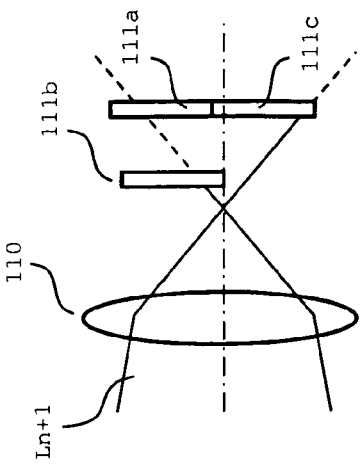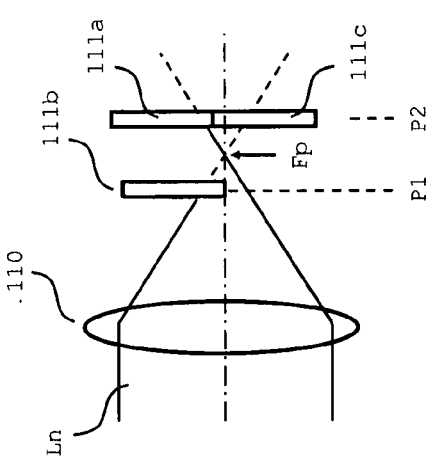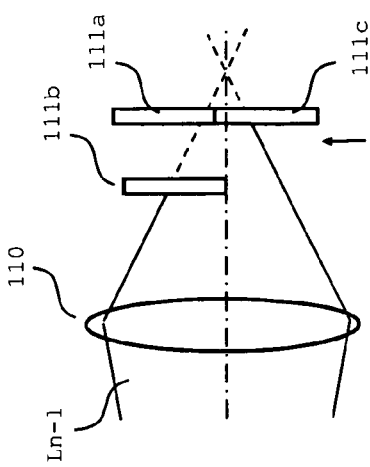
FIG.11A — Ln-1 — CROSSTALK LIGHT FROM (n-1)TH LAYER
DETECTOR A=0
DETECTOR B=(Ln-1)/2
DETECTOR C=(Ln-1)/2
FIG.11B — Ln — REPRODUCED LIGHT FROM n-TH LAYER
DETECTOR A=(Ln)/2-(ΔLn)
DETECTOR B=(Ln)/2
DETECTOR C=ΔLn
FIG.11C — Ln+1 — CROSSTALK LIGHT FROM (n+1)TH LAYER
DETECTOR A=0
DETECTOR B=(Ln+1)/2
DETECTOR C=(Ln+1)/2

DETECTOR A+DETECTOR B−DETECTOR C=Ln−2ΔLn

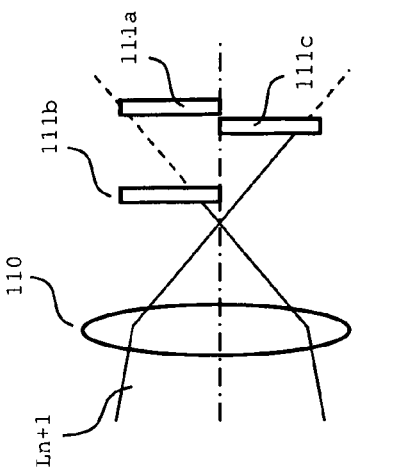
*FIG.12A*
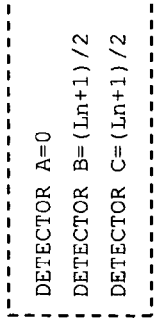
CROSSTALK LIGHT FROM (n-1)TH LAYER
DETECTOR A=0
DETECTOR B=(Ln-1)/2
DETECTOR C=(Ln-1)/2
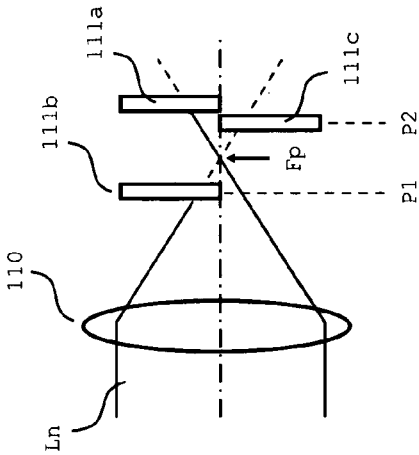
*FIG.12B*
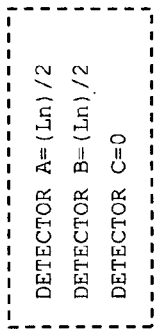
REPRODUCED LIGHT FROM n-TH LAYER
DETECTOR A=(Ln)/2
DETECTOR B=(Ln)/2
DETECTOR C=0
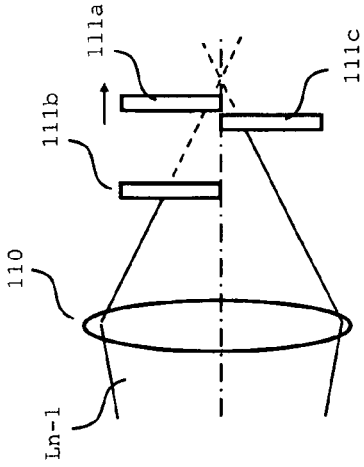
*FIG.12C*
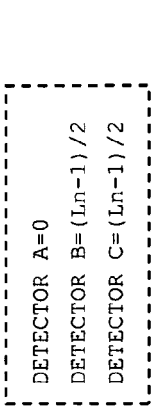
CROSSTALK LIGHT FROM (n+1)TH LAYER
DETECTOR A=0
DETECTOR B=(Ln+1)/2
DETECTOR C=(Ln+1)/2
DETECTOR A+DETECTOR B−DETECTOR C=Ln

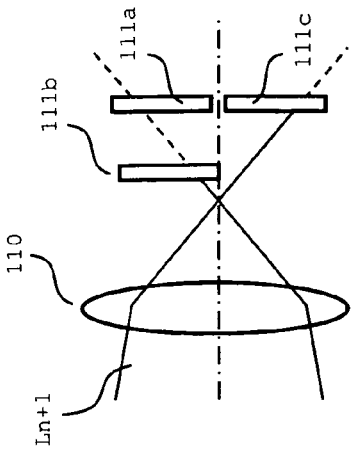
FIG. 13A
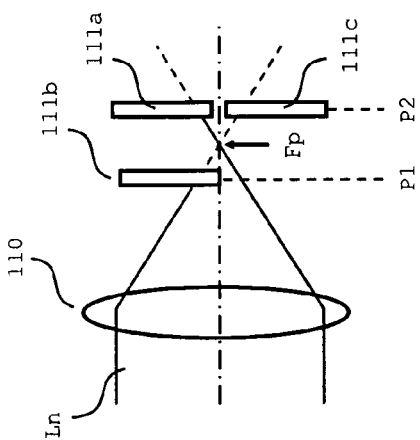
FIG. 13B
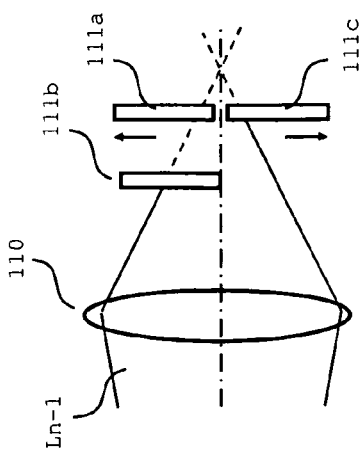
FIG. 13C

US 8,203,917 B2

OPTICAL PICKUP APPARATUS, SIGNAL GENERATING METHOD, AND OPTICAL DISK APPARATUS

This application claims priority under 35 U.S.C. Section 119 of Japanese Patent Application No. 2008-138523 filed May 27, 2008, entitled "OPTICAL PICKUP APPARATUS, SIGNAL GENERATING METHOD, AND OPTICAL DISK APPARATUS" and Japanese Patent Application No. 2008-211190 filed Aug. 19, 2008, entitled "OPTICAL PICKUP APPARATUS, SIGNAL GENERATING METHOD, AND OPTICAL DISK APPARATUS'. The disclosures of the above applications are incorporated herein by reference.

BACKGROUND OF THE INVENTION

1. Field of the Invention

The present invention relates to an optical pickup apparatus, a signal generating method, and an optical disk apparatus and, in particular, relates to an optical pickup apparatus enabling application to optical disks having a plurality of recording layers, a signal generating method of generating a reproduced signal from an output signal of the optical pickup apparatus, and an optical disk apparatus suitably used for an optical disk apparatus enabling application to optical disks having a plurality of recording layers.

2. Description of the Related Art

In recent years, the capacity of optical disks is rapidly increasing. The increase in the capacity of an optical disk is made possible by disposing a plurality of recording layers within a single disk. For example, multilayer-type disks including two recording layers on a single side have been commercialized for DVD (Digital Versatile Disk) or Blu-ray disks. When the number of recording layers is three or more, further increase in the capacity of the optical disk is enabled.

However, when a plurality of recording layers are disposed within the disk, a problem occurs that a reflected light from recording layers other than a reproduction target is incident on a photodetector, which causes deterioration in the reproduced signal. That is, a problem of interlayer crosstalk resulting from a stray light arises. Thus, when disposing a plurality of recording layers within a single disk, there needs a configuration for smoothly inhibiting and removing the stray light.

Herein, a method of removing the stray light includes that which uses a pinhole. In this method, a pinhole is disposed at a convergence position of the signal light. According to this method, a part of the stray light is intercepted by the pinhole, and therefore, it is possible to lower the unnecessary stray light component incident on the photodetector.

A further method of removing a stray light is a method of disposing a forward light shielding plate and a rear light shielding plate before a photodetector. In this method, before and after the focus point of the signal light, the forward light shielding plate and the rear light shielding plate are disposed. According to this method, only the signal light passes between the both light shielding plates, and the stray light is shielded by the both light shielding plates. Furthermore, another method of removing a stray light is a method using a polarizing optical element. In this method, an optical system is so set that the signal light and the stray light are incident on the polarizing optical element in different polarization directions. According to this method, only the signal light passes through the polarizing optical element, and thus, it may be possible to remove the unnecessary stray light components incident on the photodetector.

However, in the method in which a pinhole is disposed before the photodetector, in addition to the reflected light from reproduction-target recording layers, the stray light passes through the pinhole and reaches the photodetector. In this case, separation between recording layers is poor, and when the interval between layers is small, the amount of stray light passing through the pinhole increases, and thus results in a problem that it is difficult to properly remove interlayer crosstalk.

Furthermore, when the method of disposing a forward light shielding plate and a rear light shielding plate is used, half the reflected light from the reproduction-target recording layer is shielded. Thus, a problem arises that the use efficiency of the reflected light is decreased by about 50%. When the method employing a polarizing optical element is used, many optical components are required in order to remove the stray light, and thus, there occurs a problem that cost rises.

SUMMARY OF THE INVENTION

A first aspect of the present invention relates to an optical pickup apparatus. An optical pickup apparatus according to the first aspect is provided with: a laser light source; an objective lens for converging a laser light emitted from the laser light source on a recording medium; a photodetecting section for receiving the laser light reflected by the recording medium; and an optical system for guiding the laser light emitted from the laser light source to the objective lens and also for guiding the laser light reflected by the recording medium to the photodetecting section as a convergent light. The photodetecting section is provided with first and second photodetectors disposed at positions at which a first part of the target laser light and a second part different from the first part are respectively received, the positions being separated further from the optical system than a convergence position of a target laser light reflected by an irradiation-target recording layer, out of the laser light reflected by the recording medium, and a third photodetector disposed at a position closer to the optical system than the convergence position of the target laser light, the position being bridging more over the second part than over the first part.

In the optical pickup apparatus according to the first aspect, the first part and the second part may be a portion obtained by splitting the target laser light into two in a direction vertical to the optical axis. The third photodetector may be placed at a position bridging across a whole of the second part of the target laser light. In this case, the third photodetector may be placed at a position not bridging over the first part of the target laser light.

A second aspect of the present invention relates to a signal generating method of generating a signal based on a target laser light reflected by an irradiation-target recording layer, out of a laser light which is reflected by a recording medium to be converged onto a light detecting section. The signal generating method according to the second aspect includes steps of: placing first and second photodetectors at positions at which a first part of the target laser light and a second part different from the first part are respectively received, the positions being separated further from the recording medium than a convergence position of the target laser light; placing a third photodetector at a position closer to the recording medium than the convergence position of the target laser light, the position being bridging more over the second part than over the first part; and evaluating a signal S based on the target laser light by an arithmetic process of S=S1+S3−S2, where S1, S2, and S3 denote signals outputted from the first, second, and third photodetectors, respectively.

A third aspect of the present invention relates to an optical disk apparatus provided with an optical pickup apparatus and a signal arithmetic circuit for performing an arithmetic process on a signal from the optical pickup apparatus. In the optical disk apparatus according to the third aspect, the optical pickup apparatus is provided with: a laser light source; an objective lens for converging a laser light emitted from the laser light source on an optical disk; a photodetecting section for receiving the laser light reflected by the optical disk; and an optical system for guiding the laser light emitted from the laser light source to the objective lens and also for guiding the laser light reflected by the optical disk to the photodetecting section as a convergent light. Herein, the photodetecting section is provided with: first and second photodetectors disposed at positions at which a first part of the target laser light and a second part different from the first part are respectively received, the positions being separated further from the optical system than a convergence position of a target laser light reflected by an irradiation-target recording layer, out of the laser light reflected by the optical disk; and a third photodetector disposed at a position closer to the optical system than the convergence position of the target laser light, the position being bridging more over the second part than over the first part. Further, the signal arithmetic circuit evaluates a reproduced signal S based on the target laser light by an arithmetic process of S=S1+S3−S2, where S1, S2, and S3 denote signals outputted from the first, second, and third photodetectors, respectively.

BRIEF DESCRIPTION OF THE DRAWINGS

The above and other objects and novel features of the present invention will become more completely apparent from the description of the embodiment below taken with the following accompanying drawings.

FIG. 1A and FIG. 1B are diagrams each showing the configuration of an optical pickup apparatus according to a first embodiment;

FIG. 2A to FIG. 2C are diagrams each explaining the configuration of a photodetecting section according to the first embodiment and a stray-light inhibitory effect;

FIG. 6(A-1) to FIG. 6(C-3) are diagrams each showing incident states of a reproduced light and a stray light for the photodetector according to the second embodiment;

FIG. 10A to FIG. 10C are diagrams each explaining a stray-light inhibitory effect when the configuration of the photodetecting section according to the first embodiment is modified;

FIG. 11A to FIG. 11C are diagrams each explaining a stray-light inhibitory effect when the configuration of the photodetecting section according to the first embodiment is modified;

FIG. 12A to FIG. 12C are diagrams each explaining a stray-light inhibitory effect when the configuration of the photodetecting section according to the first embodiment is modified; and FIG. 13A to FIG. 13C are diagrams each explaining a stray-light inhibitory effect when the configuration of the photodetecting section according to the first embodiment is modified.

Figure 3:
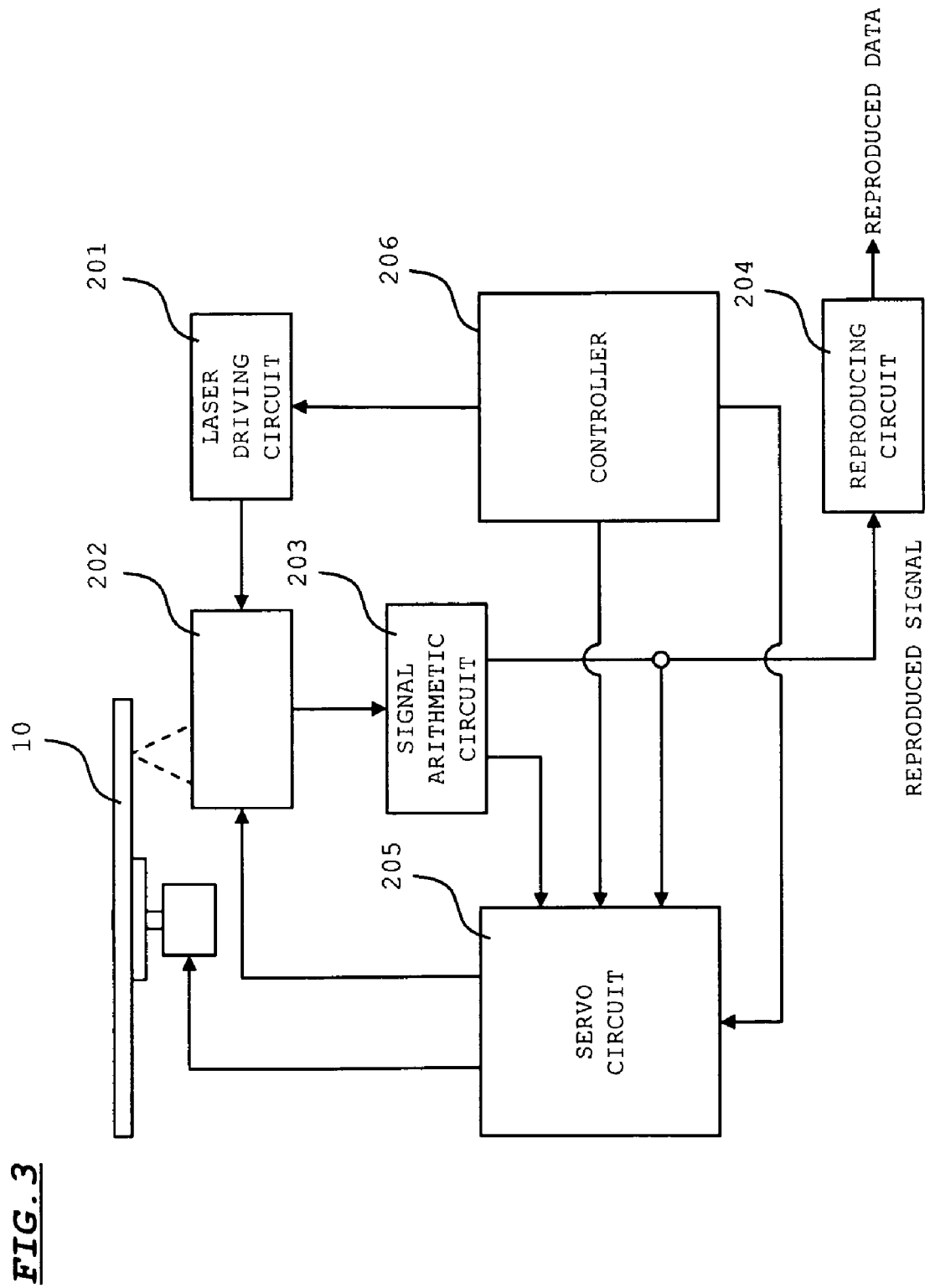
FIG. 3 is a diagram showing the configuration of relevant parts of an optical disk apparatus according to the first embodiment.

However, the diagrams are for the purposes of illustration only, and are not intended to limit the scope of the present invention.

DESCRIPTION OF THE PREFERRED EMBODIMENTS

Various embodiments of the present invention will be described below with reference to the drawings. In the embodiments, the present invention is applied to an optical disk apparatus and an optical pickup apparatus enabling application to an optical disk in which a plurality of recording layers are laminated with respect to a thickness direction.

First Embodiment

FIG. 1A and FIG. 1B show the configuration of an optical pickup according to a first embodiment. FIG. 1A is a plan view of an optical system excluding an objective lens 108. FIG. 1B is a side view of portions of an upright mirror 107 and the objective lens 108.

In FIG. 1A and FIG. 1B, a semiconductor laser 101 emits a laser light at a predetermined wavelength. A collimate lens 102 converts the laser light emitted from the semiconductor laser 101 into a parallel light. A polarizing beam splitter (PBS) 103 reflects substantially all the laser light incident from a collimate lens 102 side and transmits substantially all the laser light incident from a ¼ wavelength plate 104 side.

The ¼ wavelength plate 104 converts the laser light incident from the PBS 103 side into a circularly polarized light, and also converts a laser light incident from an expander 105 side into a polarization direction vertical to the polarization direction of the laser light incident from the PBS 103 side. Thus, substantially all of the laser light incident on the PBS 103 from the ¼ wavelength plate 104 side transmits the PBS 103 and is guided into a beam splitter 109.

The expander 105 is formed from a combination of a concave lens and a convex lens, and one of these two lenses is driven in an optical axis direction by an actuator 106. In this case, the actuator 106 is provided with a motor, a lead screw, etc., and is driven in response to a servo signal for correcting the aberration of a laser light.

The servo light transmitting the expander 105 is incident on the upright mirror 107. The upright mirror 107 reflects the laser light incident from the expander 105 side towards the objective lens 108. The reflected laser light is converged by the objective lens 108 and irradiated on an optical disk 10. The optical disk 10 has a plurality of recording layers in a thickness direction.

The laser light with which the optical disk 10 is irradiated is reflected by a recording layer disposed in the optical disk 10. After traveling in the inverse direction along the light passage, the reflected laser light transmits through the PBS 103 and is incident on the beam splitter 109. The beam splitter 109 both reflects and transmits the incident laser light at a predetermined ratio.

The laser light transmitting the beam splitter 109 is focused by a convergence lens 110. A photodetecting section 111 receives the laser light focused by the convergence lens 110 and outputs a detection signal. As described below, three photodetectors (photodetectors 111a to 111c) are disposed in the photodetecting section 111.

The laser light reflected by the beam splitter 109 is incident on an anamorphic lens 112. The anamorphic lens 112 introduces astigmatism into the incident laser light. A photodetector 113 receives the laser light with the astigmatism introduced therein and outputs a detection signal. A 4-split sensor for receiving a laser light is disposed on the photodetector 113. A focus error signal is generated from the signal outputted from the 4-split sensor using an astigmatism method, and a tracking error signal is generated using a 1-beam push-pull method.

The objective lens 108 is attached to a holder 131. The holder 131 is driven in a focusing direction and a tracking direction by an objective lens actuator 132. The objective lens actuator 132 is configured by a conventionally known coil and magnetic circuit, in which the coil is attached to the holder 131.

A servo signal is supplied to the objective lens actuator 132 to displace the objective lens 108, integrally with the holder 131, in the focusing direction and the tracking direction. In this manner, the laser light converges on an irradiation-target recording layer. The focus error signal and the tracking error signal are generated based on the output signal from the photodetector 113, as described above.

Subsequently, with reference to FIG. 2A to FIG. 2C, the configuration of the photodetecting section 111 in the first embodiment, and the method of generating a reproduced signal will be described. FIG. 2A to FIG. 2C show portions of the convergence lens 110 and the photodetecting section 111, out of the configuration shown in FIG. 1A and FIG. 1B.

As described above, the photodetecting section 111 is composed of the three photodetectors 111a to 111c. When viewed from the light receiving surface side, the three photodetectors 111a to 111c have a square contour which is of substantially the same size as the light receiving surface. As shown in FIG. 2B, the three photodetectors 111a to 111c are placed to sandwich a convergence position Fp of a laser light (hereafter, "reproduced light") Ln reflected by a reproduction-target recording layer (hereafter, "target layer") to move forwardly and backwardly in the optical axis direction of the reproduced light. The photodetectors 111a and 111c are placed so that their respective light receiving surfaces are in the same plane. The photodetector 111b is placed so that the light receiving surface is parallel to the light receiving surfaces of the photodetectors 111a and 111c.

The photodetector 111a corresponds to a first photodetector in the claims; the photodetector 111b corresponds to a third photodetector in the claims; and the photodetector 111c corresponds to a second photodetector in the claims.

The photodetector 111b is placed to bridge over the upper half of the reproduced light Ln. Thus, the upper half of the reproduced light Ln is shielded by the photodetector 111b. The lower half of the reproduced light Ln is not shielded by the photodetector 111b and all that light is incident on the photodetector 111a. When the photodetector 111b is cleared, all the upper half of the reproduced light Ln is incident on the photodetector 111c. However, in this case, since the photodetector 111b is disposed, the upper half of reproduced light Ln is not incident on the photodetector 111c, and as shown in FIG. 2B, no reproduced light at all is incident on the photodetector 111c.

FIG. 2A and FIG. 2C are diagrams each showing an incident state of the stray light in the respective photodetectors 111a to 111c when the photodetectors 111a to 111c are placed in the above manner. FIG. 2A shows an incident state of a laser light (hereafter, "stray light Ln−1") reflected by the recording layer which is closer by one layer on the objective lens 108 side than the target layer. FIG. 2C shows an incident state of a laser light (hereafter, "stray light Ln+1") reflected by the recording layer which is further away by one layer from the objective lens 108 than the target layer.

With reference to FIG. 2A, when the photodetectors 111a to 111c are placed in the above manner, the convergence position of the stray light Ln−1 is positioned further away from the convergence lens 110 than the photodetectors 111a and 111c. At this time, the lower half of the stray light Ln−1 is incident on the photodetector 111c, and no stray light Ln−1 at all is incident on the photodetector 111a.

On the other hand, the convergence position of the stray light Ln+1 is positioned closer to the convergence lens 110 than the photodetector 111b, as shown in FIG. 2C. At this time, the upper half of the stray light Ln+1 is incident on the photodetector 111c without being bridging over the photodetector 111b. The lower half of the stray light Ln+1 is bridged over the photodetector 111b and shielded, and as a result, no stray light Ln+1 at all is incident on the photodetector 111a.

When (Ln) denotes the overall quantity of reproduced light Ln, from FIG. 2B, the quantities of reproduced light Ln incident on the respective photodetectors 111a to 111c is shown as follows:

Quantity of light incident on photodetector 111a: $An=(Ln)/2$

Quantity of light incident on photodetector 111b: $Bn=(Ln)/2$

Quantity of light incident on photodetector 111c: $Cn=0$

When (Ln−1) denotes the overall quantity of stray light Ln−1, from FIG. 2A, the quantities of stray light Ln−1 incident on the respective photodetectors 111a to 111c is shown as follows:

Quantity of light incident on the photodetector 111a: $An-1=0$

Quantity of light incident on the photodetector 111b: $Bn-1=(Ln-1)/2$

Quantity of light incident on the photodetector 111c: $Cn-1=(Ln-1)/2$

Further, when (Ln+1) denotes the overall quantity of stray light Ln+1, from FIG. 2C, the quantities of stray light Ln+1 incident on the respective photodetectors 111a to 111c is shown as follows:

Quantity of light incident on the photodetector 111a: $An+1=0$

Quantity of light incident on the photodetector 111b: $Bn+1=(Ln+1)/2$

Quantity of light incident on the photodetector 111c: $Cn+1=(Ln+1)/2$

Detection signals Sa, Sb, and Sc outputted from the respective photodetectors 111a to 111c are obtained by adding a detection signal component resulting from the reproduced light Ln and detection signal components resulting from the stray lights Ln−1 and Ln+1. For the sake of convenience, when the detection signal components resulting from the reproduced light Ln and the stray lights Ln−1 and Ln+1 for the detection signals outputted from the respective photodetectors 111a to 111c are expressed as quantities of light (Ln), (Ln−1), and (Ln+1), the detection signals Sa to Sc are shown as follows:

$$Sa = \{(Ln)/2\}$$

$$Sb = \{(Ln-1)/2\} + \{(Ln+1)/2\} + \{(Ln)/2\}$$

$$Sc = \{(Ln-1)/2\} + \{(Ln+1)/2\}$$

Sa corresponds to S1 in the claims; Sb corresponds to S3 in the claims; and Sc corresponds to S2 in the claims.

When an arithmetic operation of S=Sa+Sb−Sc is performed, with respect to the detection signals Sa, Sb, and Sc, the following arithmetic result is obtained:

$$\begin{aligned} S &= \{(Ln)/2\} + \{(Ln)/2\} + \{(Ln-1)/2\} + \\ & \quad \{(Ln+1)/2\} - \{(Ln-1)/2\} - \{(Ln+1)/2\} \\ &= \{(Ln)/2\} + \{(Ln)/2\} \\ &= (Ln) \end{aligned} \quad (1)$$

As understood from this arithmetic operation, when performing the arithmetic operation of S=Sa+Sb−Sc, the detection signal components resulting from the stray lights Ln−1 and Ln+1 received respectively by the photodetectors 111b and 111c are cancelled out each other, and in the arithmetic result S, only the detection signal component of the reproduced light Ln is left.

That is, the signal S evaluated from the arithmetic operation of S=Sa+Sb−Sc is based solely on the signal component for the reproduced light Ln, and the signal S is not superimposed at all by the signal components resulting from the stray lights Ln−1 and Ln+1. Therefore, when the three photodetectors 111a to 111c are placed as shown in FIG. 2A to FIG. 2C, and if an arithmetic operation of S=Sa+Sb−Sc is performed with respect to the detection signals Sa, Sb, and Sc outputted from the respective photodetectors 111a to 111c, the evaluated signal S is a reproduced signal based solely on the light quantity component of the reproduced light, and is not affected at all by the stray lights Ln−1 and Ln+1. Moreover, the reproduced signal S, as understood from the Equation (1), is based on the total light quantity of the reproduced light Ln, and the use efficiency of the reproduced light in generating the reproduced signal S is 100%.

Thus, in the configuration shown in FIG. 2A to FIG. 2C, it is possible to completely remove the influence of the stray light on the reproduced signal. Furthermore, since it is possible to remove the influence of the stray light by using only the three photodetectors 111a to 111c, it is possible to simplify the configuration and reduce cost. In addition, since the reproduced signal is generated by using the total light quantity of the reproduced light, it is possible to maintain the use efficiency of the reproduced light in generating the reproduced signal S to a high level.

FIG. 3 is a diagram showing the configuration of the relevant parts of an optical disk apparatus. As shown in FIG. 3, the optical disk apparatus is provided with: a laser driving circuit 201; an optical pickup apparatus 202; a signal arithmetic circuit 203; a reproducing circuit 204; and a servo-circuit 205.

The optical pickup apparatus 202 is provided with an optical system as shown in FIG. 1A and FIG. 1B. The laser driving circuit 201 drives a semiconductor laser 101 disposed within the optical pickup apparatus 202 in response to a command from a controller 206. That is, the laser driving circuit 201 during reproduced drives the semiconductor laser 101 so that a laser light is emitted at a predetermined power.

The signal arithmetic circuit 203 performs an arithmetic process on an output signal from the photodetecting section 111 and the photodetector 113 disposed within the optical pickup apparatus 202, generates a reproduced signal, a focus error signal, and a tracking error signal, and outputs these signals to the corresponding circuits. The signal arithmetic circuit 203, as described with reference to FIG. 2A to FIG. 2C, performs an arithmetic process of S=Sa+Sb−Sc on the detection signals Sa to Sc from the photodetectors 111a to 111c, and generates a reproduced signal S. Furthermore, the signal arithmetic circuit 203 uses the detection signal outputted from the photodetector 113 (4-split sensor) to generate a focus error signal using an astigmatism method, and uses that detection signal to generate a tracking error signal using a 1-beam push-pull method.

The reproducing circuit 204 generates reproduced data by demodulating and reproducing the reproduced signal inputted from the signal arithmetic circuit 203, and outputs this signal to later-stage circuits (not shown).

The servo-circuit 205 uses the focus error signal and the tracking error signal inputted from the signal arithmetic circuit 203 to generate a focus servo signal and tracking servo signal, and supplies these signals to the objective lens actuator 132. The servo-circuit 205 monitors the reproduced signal inputted from the signal arithmetic circuit 203, and controls the actuator 106 within the optical pickup apparatus 202 so that the reproduced signal is optimized. Furthermore, the servo-circuit 205 performs focus pull-in on a laser light with respect to the target layer in response to a command from the controller 206.

As shown above, according to the first embodiment, the photodetectors 111a to 111c are placed as shown in FIG. 2A to FIG. 2C, and a reproduced signal S with respect to a target layer is generated by performing an arithmetic process of S=Sa+Sb−Sc with respect to the signals Sa, Sb, and Sc outputted from the photodetectors 111a to 111c. Thereby, it becomes possible to completely remove the influence of the stray light on the reproduced signal S, thereby making it possible to generate and output reproduced signals without interlayer crosstalk.

Furthermore, according to the first embodiment, since it is possible to eliminate the influence of the stray light by using only the three photodetectors 111a to 111c, it becomes possible to simplify the configuration and reduce cost. Moreover, since the reproduced signal S is based on the total light quantity of reproduced light Ln, it becomes possible to enable a substantially-100% use efficiency of the reproduced light in generating the reproduced signal S.

As described above, according to the first embodiment, while enabling a substantially-100% use efficiency of reproduced light, it is possible to smoothly remove a stray light or interlayer crosstalk using a simplified and cost-effective configuration.

Second Embodiment

In the first embodiment, the laser light reflected by the optical disk 10 is separated into two lights by the beam splitter 109, and the separated laser lights are received by the photodetecting section 111 and the photodetector 113, respectively. In contrast, in a second embodiment, the laser light reflected by the optical disk is received by a single photodetecting section without being separated.

In the second embodiment as in the first embodiment, the reproduced light Ln means a laser light which is reflected by the target layer; the stray light Ln−1 means a laser light reflected by the recording layer which is closer by one layer on the objective lens side than the target layer; and the stray light Ln+1 means a laser light which is reflected by the recording layer separated from the objective lens by one layer more than the target layer is.

Figure 4B:
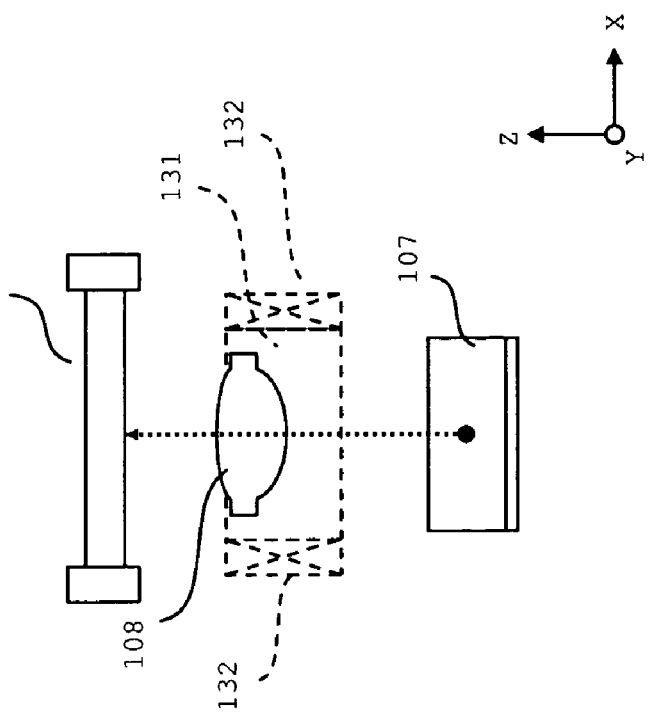
FIG. 4A and FIG. 4B are diagrams each showing the configuration of an optical pickup apparatus according to a second embodiment.
Figure 4A:
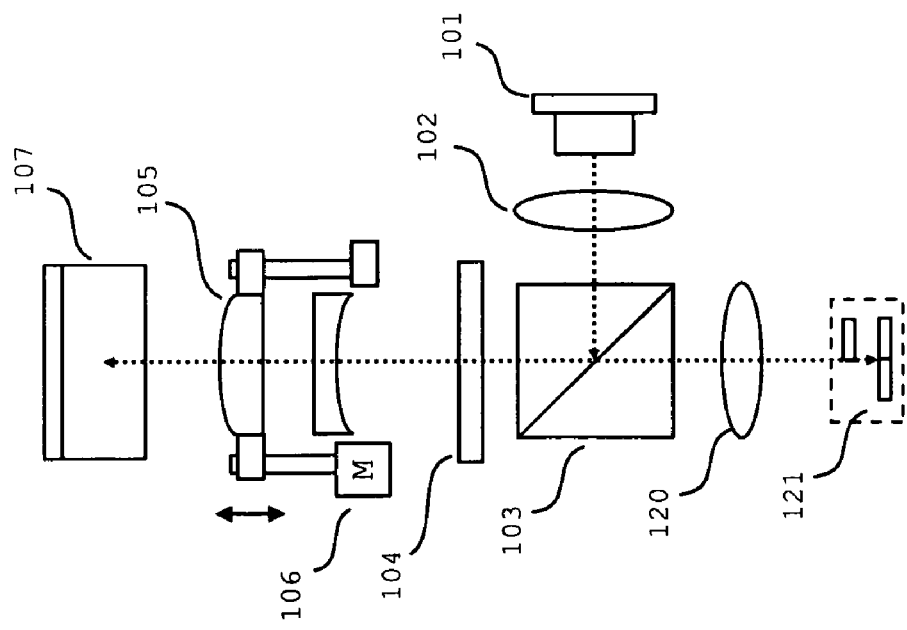

FIG. 4A and FIG. 4B show the configuration of an optical pickup according to the second embodiment. FIG. 4A is a plan view of an optical system excluding the objective lens 108. FIG. 4B is a side view of a portion of the upright mirror 107 and the objective lens 108.

In FIG. 4A and FIG. 4B, reference numeral 120 denotes an anamorphic lens and 121 denotes a photodetecting section. The anamorphic lens 120 introduces astigmatism into the laser light reflected by the optical disk 10. The photodetecting section 121 is provided with three photodetectors 121a to 121c, as described later. An arithmetic process is performed on detection signals from the photodetectors 121a to 121c, as described later, in order to generate a reproduced signal, a focus error signal, and a tracking error signal. The rest of the configuration is similar to that shown in FIG. 1A and FIG. 1B in the first embodiment.

Figure 5:
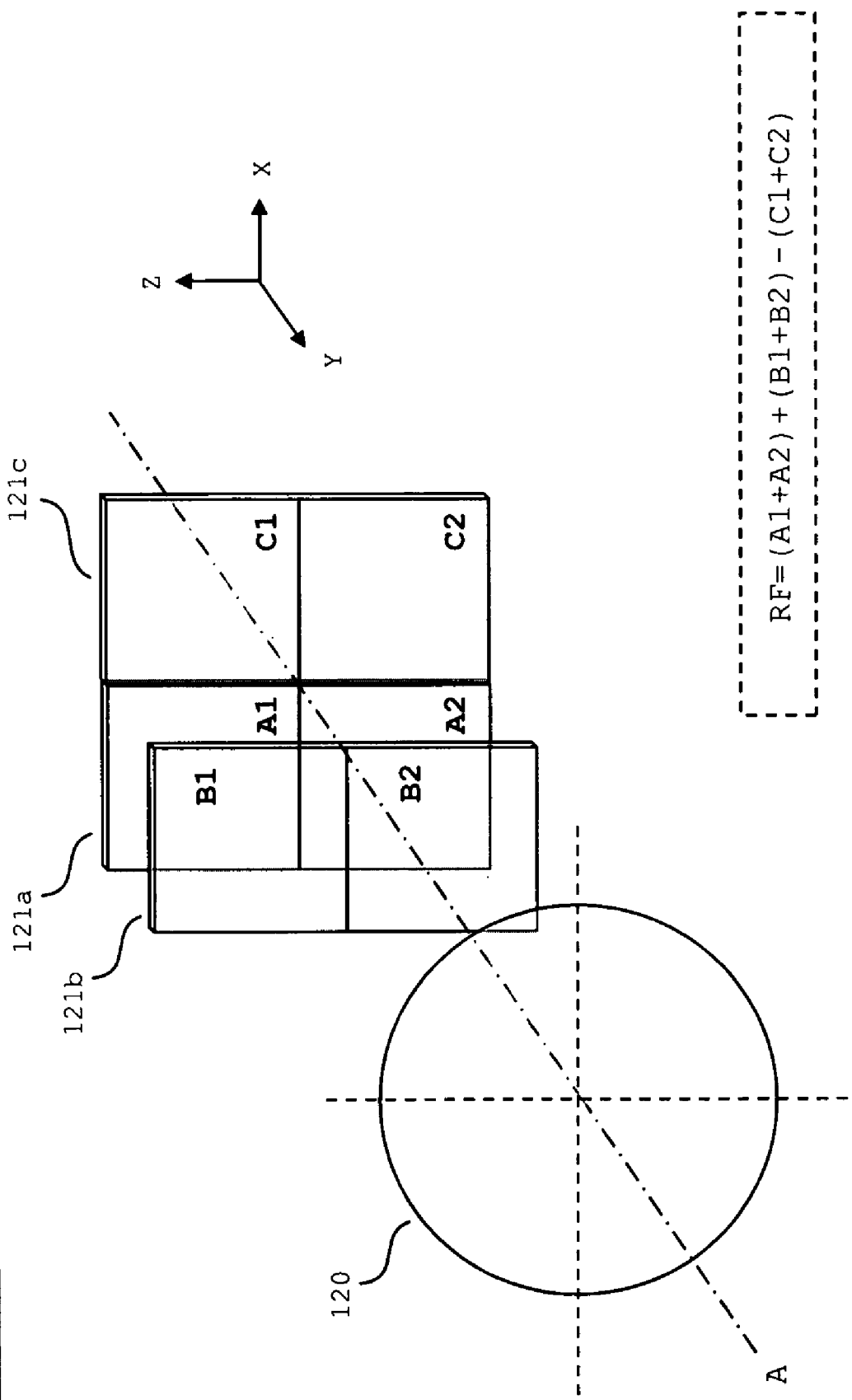
FIG. 5 is a diagram showing the configuration of a photodetector according to the second embodiment.

FIG. 5 shows the configuration of the photodetecting section 121. As shown in FIG. 5, the photodetecting section 121 is provided with three photodetectors 121a to 121c. The photodetectors 121a to 121c have the similar contour as the photodetectors 111a to 111c in the first embodiment, and are placed at the same position as in the first embodiment.

However, in the second embodiment, unlike the first embodiment, light receiving regions of the photodetectors 111a to 111c are each split into two in a direction orthogonal to a direction of alignment of the photodetectors 121a and 121c (in FIG. 5, a Z-axis direction). That is, the photodetectors 121a to 121c are each disposed with: light-receiving regions A1 and A2; light-receiving regions B1 and B2; and light-receiving regions C1 and C2, and from these light-receiving regions A1, A2, B1, B2, C1, and C2, detection signals Sa1 and Sa2, Sb1, Sb2, Sc1, and Sc2 are respectively outputted.

In this case, the detection signal Sa of the overall photodetector 121a is obtained by adding the detection signals Sa1 and Sa2 outputted from the light-receiving regions A1 and A2. Likewise, the detection signal Sb of the overall photodetector 121b is obtained by adding the detection signals Sb1 and Sb2 outputted from the light-receiving region B1 and B2, and the detection signal Sc of the overall photodetector 121c is obtained by adding the detection signals Sc1 and Sc2 outputted from the light-receiving regions C1 and C2.

In this case also, similar to the first embodiment, performing an arithmetic operation of S=Sa+Sb−Sc with respect to the detection signals Sa, Sb, and Sc enables the generation of reproduced signals in which stray light components are removed. Therefore, based on the detection signals from each light-receiving region, the following arithmetic operation is performed:

$$S=(Sa1+Sa2)+(Sb1+Sb2)-(Sc1+Sc2) \quad (2)$$

As a result, it becomes possible to acquire a reproduced signal S based solely on the reproduced light Ln in which stray light components are removed.

Subsequently, with reference to FIG. 6, the generating method of a focus error signal in the second embodiment will be described. FIG. 6(A-1) to FIG. 6(C-1); FIG. 6(A-2) to FIG. 6(C-2); and FIG. 6(A-3) to FIG. 6(C-3) each show in a side-by-side manner a convergence state of the stray light Ln−1, the reproduced light Ln, and the stray light Ln+1 from the anamorphic lens 120 toward the photodetectors 121a to 121c, and a beam shape of the stray light Ln−1, the reproduced light Ln, and the stray light Ln+1 on the photodetectors 121a to 121c at that time.

FIG. 6(A-2) shows a state of the reproduced light when the convergence position for a reproduced light (a position at which the beam shape is perfectly circular, same hereafter) Fp is closer to the photodetector 121b side than an intermediate position between the photodetectors 121a, 121c and the photodetector 121b. FIG. 6(A-1) and FIG. 6(A-3) show states of the stray light Ln−1 and the stray light Ln+1, respectively, when the reproduced light is in the state as shown in FIG. 6(A-2).

FIG. 6(B-2) shows a state of the reproduced light when the convergence position Fp for a reproduced light is at the intermediate position between the photodetectors 121a, 121c and the photodetector 121b. FIG. 6(B-1) and FIG. 6(B-3) show states of the stray light Ln−1 and the stray light Ln+1, respectively, when the reproduced light is in the state as shown in FIG. 6(B-2).

FIG. 6(C-2) shows a state of the reproduced light when the convergence position Fp for a reproduced light is closer to the photodetectors 121a and 121c side than the intermediate position between the photodetectors 121a, 121c and the photodetector 121b. FIG. 6(C-1) and FIG. 6(C-3) show states of the stray light Ln−1 and the stray light Ln+1, respectively, when the reproduced light is in the state as shown in FIG. 6(C-2).

The phrase, "a direction of the astigmatism" employed to mean a direction to which a beam shape of the reproduced light, or a target laser light, transforms from a perfectly circular shape to an oval shape due to the astigmatism as shown in FIG. 6 (A-2), FIG. 6 (B-2), and FIG. 6 (C-2). As shown in FIG. 6 (A-2), FIG. 6 (B-2), and FIG. 6 (C-2), a transformation direction of the reproduced light (direction of the astigmatism) is inclined by 45 degrees relative to the direction of alignment of the photodetector 121a and the photodetector 121c.

Now, with reference to FIG. 6(A-2), FIG. 6(B-2), and FIG. 6(C-2), when there is no influence caused by the stray light Ln−1 and the stray light Ln+1, it is possible to evaluate the focus error signal based on the normal astigmatism method by the arithmetic operation of (Sa1−Sa2)−(Sb1−Sb2) based on the detection signals Sa1, Sa2, Sb1, and Sb2. However, in the second embodiment, since the photodetector 121b is forward of the photodetector 121a, it is difficult to evaluate the focus error signal from the arithmetic operation of (Sa1−Sa2)−(Sb1−Sb2). Further, in the second embodiment, in an on focus state, the convergence position Fp for a reproduced light needs to be positioned at the intermediate position between the photodetector 121b and the photodetectors 121a and 121c.

For the reasons stated above, in the second embodiment, the focus error signal in which there is no influence caused by the stray lights Ln−1 and Ln+1 is to be evaluated from the arithmetic operation of (Sa1−Sa2)+(Sb1−Sb2). The appropriateness of the arithmetic method will be described with reference to FIG. 7A and FIG. 7B, later.

The arithmetic expression of the case where the stray light is not taken into account has been described, but actually, as shown in FIG. 6(A-1), FIG. 6(B-1) and FIG. 6(C-1), and FIG. 6(A-3), FIG. 6(B-3), and FIG. 6(C-3), the stray light Ln−1 and the stray light Ln+1 are superimposed on the photodetector 121b, and thus, the signal components resulting from the stray lights need to be canceled out by using the detection signals Sc1 and Sc2 from the photodetector 121c.

In consideration of the respective corresponding light-receiving regions C2 and C1, it is possible to cancel out the signal components by the arithmetic operation of (Sb1−Sc2)−(Sb2−Sc1) in the light-receiving regions B1 and B2. Thus, it is possible to evaluate a focus error signal FE based on the following equation of:

$$FE = (Sa1 - Sa2) + \{(Sb1 - Sc2) - (Sb2 - Sc1)\} \quad (3)$$
$$= (Sa1 - Sa2) + (Sb1 - Sb2) + (Sc1 - Sc2)$$

However, the photodetector 121b and the photodetector 121c are placed at a mutually deviated position with respect to the optical axis direction of the reproduced light, and therefore, as shown in FIG. 6, the beam shapes of the stray lights Ln−1 and Ln+1 are different at the photodetector 121b and the photodetector 121c. Consequently, in the Equation (3), even when the arithmetic operation of (Sb1−Sb2)+(Sc1−Sc2) is performed, it is difficult to completely remove the signal components resulting from the stray lights from the focus error signal FE.

However, since the signal components resulting from the stray lights depend on the differences in the beam shape of the stray lights Ln−1 and Ln+1 at the photodetector 121b and the photodetector 121c, the amount (level) of superimposing is based on the difference of the both beam shapes and does not result in so large an amount. Therefore, it is possible to inhibit the signal components resulting from the stray lights Ln−1 and Ln+1 to a fairly small level by performing the arithmetic process of the Equation (3), and also possible to effectively inhibit the influence of the stray light relative to the focus error signal.

In the Equation (3), although the signal component resulting from the stray light from the (n−1)th layer is cancelled out by the signal component resulting from the stray light from the (n−1)th layer, it is also possible for the signal component resulting from the stray light from the (n−1)th layer to be cancelled out by the signal component resulting from the stray light from the (n+1)th layer. Thus, it is possible to evaluate the focus error signal FE based on the following equation of:

$$FE = (Sa1 - Sa2) + \{(Sb1 - Sc2) - (Sb2 - Sc1)\}$$
$$= (Sa1 - Sa2) + (Sb1 - Sb2) + (Sc1 - Sc2)$$

In this case also, although it is difficult to completely remove the signal component resulting from the stray light from the focus error signal, effective inhibition is possible.

Figure 7B:
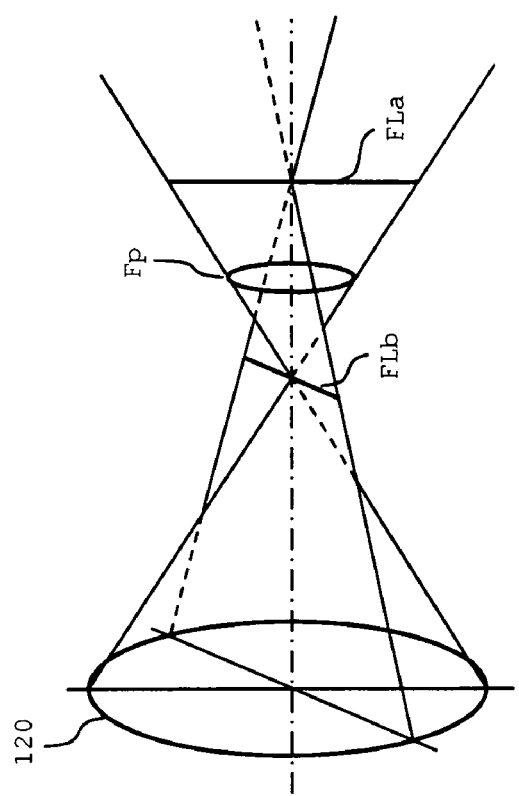
FIG. 7B is a diagram showing a relationship between the convergence position and two focal lines for the reproduced light according to the second embodiment.
Figure 7A:
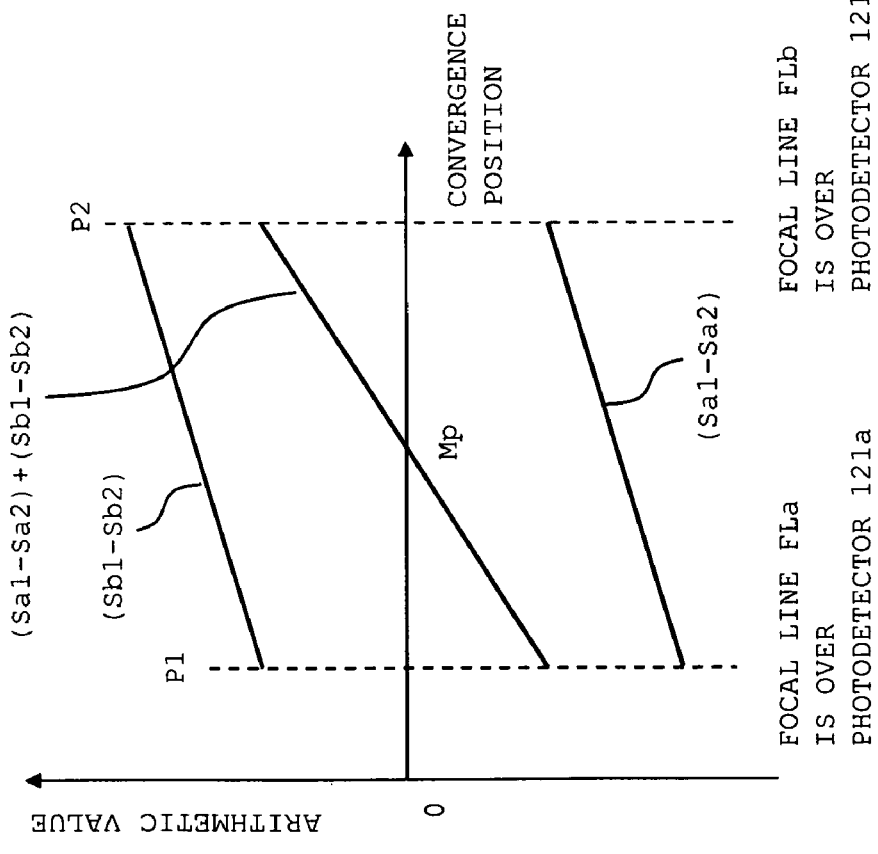
FIG. 7A is a graph showing arithmetic values of a detection signal of the photodetector according to the second embodiment.

Subsequently, with reference to FIG. 7A and FIG. 7B, evaluating the focus error signal by the arithmetic operation of (Sa1-Sa2)+(Sb1-Sb2) when the stray light is not taken into account will be described. FIG. 7A is a graph expressing abbreviated processing of arithmetic values for (Sa1-Sa2), (Sb1-Sb2), and (Sa1-Sa2)+(Sb1-Sb2) when the signal components for the reproduced light Ln are examined. FIG. 7B is a diagram showing a relationship between the convergence position Fp for a reproduced light, and two focal lines FLa and FLb for the reproduced light.

In FIG. 7A, P1 denotes a convergence position for a laser light when the focal line FLa is over the photodetector 121a, and P2 denotes a convergence position for a laser light when the focal line FLb is over the photodetector 121b. It is noted that in this case, the optical system is adjusted so that an interval between the focal lines FLa and FLb is longer than an interval between the photodetectors 121a and 121b in the optical axis direction of the laser light. That is, when the convergence position Fp is at the intermediate position of the photodetector 121a and the photodetector 121b, the focal line FLb is positioned closer to the anamorphic lens 120 than the photodetector 121b and the focal line FLa is positioned further from the anamorphic lens 120 than the photodetector 121a.

When the convergence position for a reproduced light shifts from P1 to P2 as a result of a focus deviation, the shapes of the reproduced light on the photodetectors 121a and 121b vary from the state in FIG. 6(A-2) to the states in FIG. 6(B-2) and FIG. 6(C-2). As a result of this variation in shape, the arithmetic values of (Sa1−Sa2) and (Sb1−Sb2) vary as shown in FIG. 7A. Thus, in a zone from P1 to P2, the arithmetic values for (Sa1−Sa2)+(Sb1−Sb2) take a value of zero at a substantial intermediate point Mp as shown in FIG. 7A.

Therefore, when the photodetector 121b and photodetectors 121a and 121c are placed so that the convergence position Fp for a reproduced light during the on focus state is positioned at the intermediate position between the photodetector 121b and the photodetectors 121a and 121c, it is possible to adequately acquire the focus error signal by arithmetic operation of (Sa1−Sa2)+(Sb1−Sb2). The optical system for the optical pickup apparatus is designed so that the laser light converges on the target layer when the convergence point for the reproduced light Ln is substantially at the intermediate position between the photodetector 121b, and the photodetectors 121a and 121c.

Further, it is possible to inhibit the influence resulting from the stray lights Ln−1 and Ln+1 in the tracking error signal TR by a 1-beam push-pull method, when it is evaluated according to the following equation of:

$$TR=(Sa1+Sa2)-\{(Sb1+Sb2)-(Sc1+Sc2)\} \quad (4)$$

In this case also, similar to the case of the focus error signal, since the beam shapes of the stray lights Ln−1 and Ln+1 differ between the photodetector 121b and the photodetector 121c, even when performing an arithmetic operation of (Sb1+Sb2)−(Sc1+Sc2) in the Equation (4), it is difficult to completely remove the signal components resulting from these stray lights from the tracking error signal TR. However, since the signal components resulting from the stray light in this case also depend on differences in the beam shape of the stray lights Ln−1 and Ln+1 between the photodetector 121b and the photodetector 121c, the amount of superimposing with respect to the tracking error signal is not very large. Therefore, the arithmetic process according to the Equation (4) enables the inhibition of the signal components resulting from the stray lights Ln−1 and Ln+1 to fairly low levels and enables effective inhibition of the influence of the stray light on the tracking error signal.

As described above, according to the second embodiment, it is possible to inhibit the influence of the stray light on the reproduced signal, the focus error signal, and the tracking error signal to a low level. Furthermore, similar to the first embodiment, since it is possible to inhibit the influence of the stray light by using only the three photodetectors 121a to 121c, it becomes possible to simplify the configuration and reduce cost. Moreover, since the reproduced signal, the focus error signal, and the tracking error signal are based on the total light quantity of the reproduced light Ln, the use efficiency of the reproduced light in generating the reproduced signal is substantially 100%. In addition, according to the second embodiment, since the configuration of from the beam splitter 109 to the photodetector 113 in FIG. 1A can be omitted, it is possible to simplify the optical system.

MODIFIED EXAMPLE

Hereafter, the stray-light inhibitory effect when the configuration of the photodetecting section 111 in the first embodiment is modified in various ways from the arrangement shown in FIG. 2A to FIG. 2C will be examined.

Figure 8A:
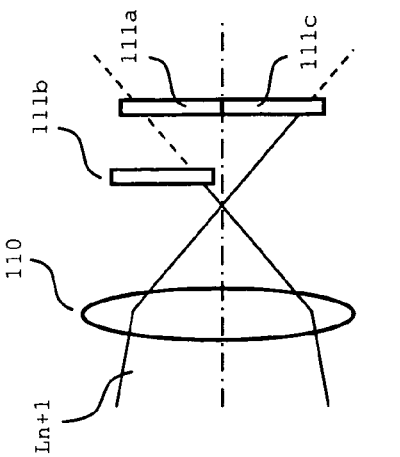
FIG. 8A to FIG. 8C are diagrams each explaining a stray-light inhibitory effect when the configuration of the photodetecting section according to the first embodiment is modified.
Figure 8B:
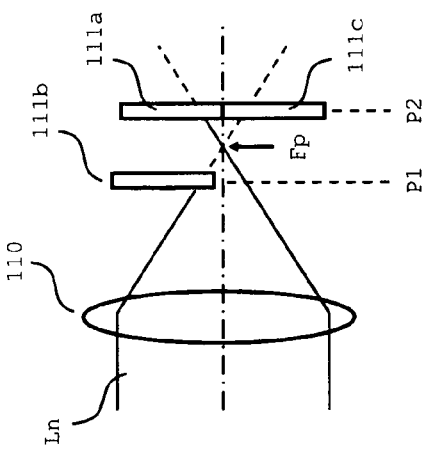
Figure 8C:
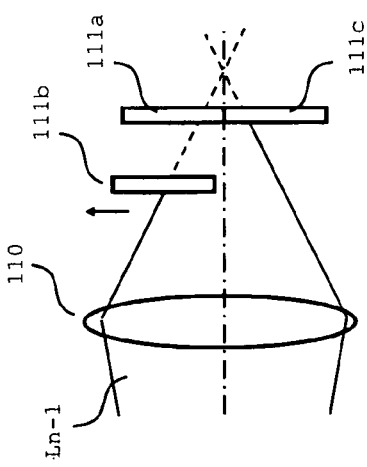

FIG. 8A to FIG. 8C show a state where the photodetector 111b is slightly displaced upwardly. In this case, part of the upper half of the reproduced light Ln, the stray lights Ln−1 and Ln+1 is not shielded by the photodetector 111b according to the displacement of the photodetector 111b and therefore reaches the photodetector 111a or the photodetector 111c.

The Equation (1) is solved where the quantities of the reproduced light Ln and the stray lights Ln−1 and Ln+1 reaching the photodetector 111a or the photodetector 111c according to the displacement of the photodetector 111b are ($\Delta$Ln), ($\Delta$Ln−1), and ($\Delta$Ln+1), respectively. The reproduced signal S is then as follows:

$$S=(Ln)-2\cdot(\Delta Ln)$$

Thus, when the photodetector 111b is displaced upwardly from the state shown in FIG. 2A to FIG. 2C, the level of the reproduced signal S is decreased by the light quantity ($\Delta$Ln) for a reproduced light which is no longer shielded according to the displacement. However, since in this case also the signal components of the stray lights Ln−1 and Ln+1 are not superimposed on the reproduced signal S, the influence of the stray lights Ln−1 and Ln+1 on the reproduced signal S is completely removed. That is, in the configurations in FIG. 8A to FIG. 8C, although the use efficiency of the reproduced light Ln is slightly decreased, it is possible to completely remove the influence of the stray lights Ln−1 and Ln+1 on the reproduced signal S, similar to the first and second embodiments.

Figure 9A:
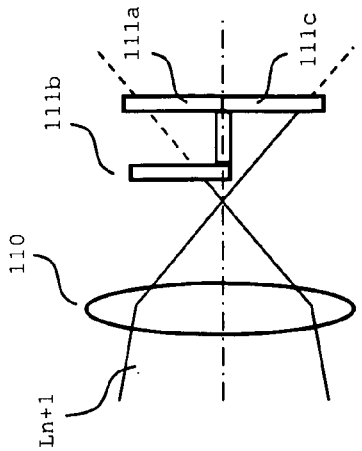
FIG. 9A to FIG. 9C are diagrams each explaining a stray-light inhibitory effect when the configuration of the photodetecting section according to the first embodiment is modified.
Figure 9B:
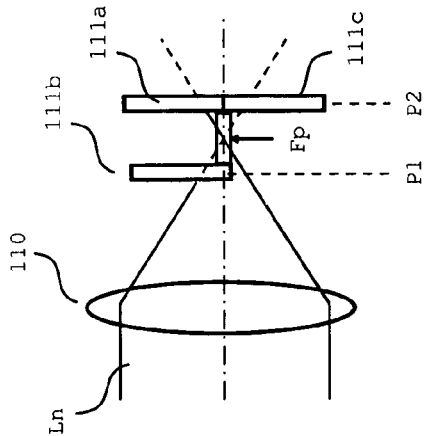
Figure 9C:
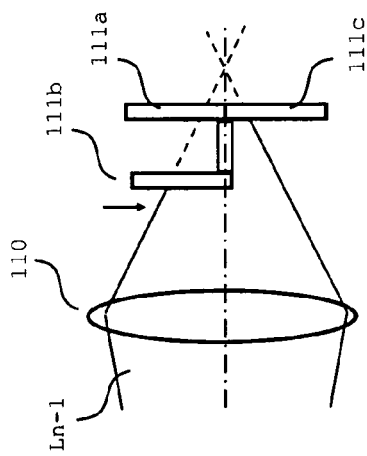

FIG. 9A to FIG. 9C show a state where the photodetector 111b is displaced slightly downwardly from the state shown in FIG. 2A to FIG. 2C. In this case, part of the lower half of the reproduced light Ln and the stray lights Ln−1 and Ln+1 is shielded by the photodetector 111b according to the displacement of the photodetector 111b.

The Equation (1) is solved where the quantities of the reproduced light Ln and the stray lights Ln−1 and Ln+1 shielded according to the displacement of the photodetector 111b are ($\Delta$Ln), ($\Delta$Ln−1), and ($\Delta$Ln+1), respectively. The reproduced signal S is then as follows:

$$S=(Ln)+2\cdot\{(\Delta Ln-1)+(\Delta Ln+1)\}$$

Thus, when the photodetector 111b is displaced downwardly from the position shown in FIG. 2A to FIG. 2C, the signal components resulting from the light quantities ($\Delta$Ln−1) and ($\Delta$Ln+1) of the stray light shielded according to the displacement are superimposed on the reproduced signal S. That is, in the configuration in FIG. 9A to FIG. 9C, similar to the first and second embodiments, although the use efficiency of the reproduced light Ln is maintained at 100%, it is difficult to completely remove the influence of the stray lights Ln−1 and Ln+1 on the reproduced signal S.

However, since the influence of the stray light on the reproduced signal S is 2~{($\Delta$Ln−1)+($\Delta$Ln+1)}, if the downward displacement amount of the photodetector 111b (the shielding amount of the lower half of the stray light) is small, the superimposing amount on the signal components resulting from the stray lights Ln−1 and Ln+1 is not very large. Thus, when the downward displacement amount of the photodetector 111b is small, it becomes possible to obtain the reproduced signal S in which the influence of the stray light is effectively inhibited.

FIG. 11A to FIG. 10C show a state where the photodetectors 111a and 111c are displaced slightly downwardly from the state shown in FIG. 2A to FIG. 2C. In this case, incident amounts of the stray lights Ln−1 and Ln+1 on the photodetectors 111a and 111c vary according to the displacement of the photodetectors 111a and 111c. That is, in FIG. 1A, the incident amount of the stray light Ln−1 on the photodetector 111c is diminished by an amount corresponding to the increase in the incident amount of the stray light Ln−1 on the photodetector 111a. Furthermore, as also shown in FIG. 10C, the incident amount of the stray light Ln+1 on the photodetector 111c is diminished by an amount corresponding to the increase in the incident amount of the stray light Ln+1 on the photodetector 111a.

The Equation (1) is solved where the variation amount of the incident amount in the stray lights Ln−1 and Ln+1 on the photodetectors 111a and 111c are ($\Delta$Ln−1) and ($\Delta$Ln+1), respectively. The reproduced signal S is then as follows:

$$S=(Ln)+2\cdot\{(\Delta Ln-1)+(\Delta Ln+1)\}$$

Thus, when the photodetectors 111a and 111c are displaced downwardly from the position shown in FIG. 2A to FIG. 2C, the signal components resulting from the quantities of light ($\Delta$Ln−1) and ($\Delta$Ln+1) of the stray light increased and decreased according to the displacement are superimposed on the reproduced signal S. That is, in the configuration shown in FIG. 10A to FIG. 10C, similar to the first and second embodiments above, although the use efficiency of the reproduced light Ln is maintained at 100%, it is difficult to completely remove the influence of the stray lights Ln−1 and Ln+1 on the reproduced signal S.

However, in this case also, since the influence of the stray light on the reproduced signal S is 2·{($\Delta$Ln−1)+($\Delta$Ln+1)}, similar to the case in FIG. 9A to FIG. 9C, if the downward displacement amount of the photodetectors 111a and 111c is small, the superimposing amount of the signal components resulting from the stray lights Ln−1 and Ln+1 is not very large. Thus, it is possible to obtain the reproduced signal S in which the influence of the stray light is effectively inhibited.

FIG. 11A to FIG. 11C show a state where the photodetectors 111a and 111c are displaced slightly upwardly from the state shown in FIG. 2A to FIG. 2C. In this case, the incident amount of the reproduced light Ln on the photodetectors 111a and 111c varies according to the displacement of the photodetectors 111a and 111c. That is, in FIG. 11B, the incident amount of the reproduced light Ln on the photodetector 111a is reduced, and corresponding to that diminished amount, the incident amount of the reproduced light Ln on the photodetector 111c is increased.

The Equation (1) is solved, where the variation amount in the incident amount of the reproduced light Ln on the photodetectors 111a and 111c is ($\Delta$Ln). The reproduced signal S is then as follows:

$$S=(Ln)-2\cdot(\Delta Ln)$$

Thus, when the photodetectors 111a and 111c are displaced upwardly from the state shown in FIG. 2A to FIG. 2C, the level of the reproduced signal S is decreased by a quantity ($\Delta$Ln) of the reproduced light varying according to the displacement. However, since in this case also, similar to the case of FIG. 2A to FIG. 2C, the signal components of the stray lights Ln−1 and Ln+1 are not superimposed on the reproduced signal S, the influence of the stray lights Ln−1 and Ln+1 on the reproduced signal S are completely removed.

That is, in the configuration shown in FIG. 11A to FIG. 11C, although the use efficiency of the reproduced light Ln is slightly decreased, it is possible to completely remove the influence of the stray lights Ln−1 and Ln+1 on the reproduced signal S, similar to the first and second embodiments.

FIG. 12A to FIG. 12C show a state where the photodetector 111a is displaced in an optical axis direction of the reproduced light, from the state shown in FIG. 2A to FIG. 2C. In this case, the incident amounts of the reproduced light Ln and the stray lights Ln−1 and Ln+1 on the photodetectors 111a and 111c do not vary according to the displacement of the photodetector 111a. Thus, when solving the Equation (1), the stray-light inhibitory effect is provided which is the same as that in FIG. 2A to FIG. 2C.

FIG. 13A to FIG. 13C show states where the photodetectors 111a and 111c are displaced slightly upwardly and downwardly from the state shown in FIG. 2A to FIG. 2C, respectively. In this case, the incident amounts of the reproduced light Ln and the stray lights Ln−1 and Ln+1 on the photodetectors 111a and 111c vary according to the displacement of the photodetectors 111a and 111c. That is, in FIG. 13A, the incident amount of the stray light Ln−1 on the photodetector 111c is diminished; in FIG. 13B, the incident amount of the reproduced light Ln on the photodetector 111a is diminished; and in FIG. 13C, the incident amount of the stray light Ln+1 on the photodetector 111c is diminished.

When the diminishing amounts of the incident amounts of the stray light Ln−1, the reproduced light Ln, and the stray light Ln+1 on the photodetectors 111a, 111b, and 111c are (ΔLn−1), (ΔLn), and (ΔLn+1), respectively, the Equation (1) is solved, the reproduced signal S is then as follows:

$$S=(Ln)-(\Delta Ln)+(\Delta Ln-1)+(\Delta Ln+1)$$

Thus, when the photodetectors 111a and 111c are displaced upwardly and downwardly form the states shown in FIG. 2A to FIG. 2C, respectively, the signal component resulting from the quantity (ΔLn−1), (ΔLn+1) of the stray light diminished according to the displacement is superimposed on the reproduced signal S. Furthermore, in FIG. 13A to FIG. 13C, the use efficiency of the reproduced light Ln is decreased from 100% by an amount corresponding to (ΔLn).

However, in this case also, since the influence of the stray light on the reproduced signal S is {(ΔLn−1)+(ΔLn+1)}, when the displacement amount of the photodetectors 111a and 111c is small, the amount of superimposing of the signal component resulting from the stray lights Ln−1 and Ln+1 is not large and this makes it possible to obtain the reproduced signal S in which the influence of the stray light is effectively inhibited. Furthermore, when the displacement amount of the photodetectors 111a is small, (ΔLn) is not so decreased as it might be expected, and therefore, it is possible to maintain the use efficiency of the reproduced light to a high level.

The various embodiments of the present invention are thus described above. However, the present invention is not limited thereto, and the embodiments of the present invention can also be modified in various ways apart from the aforementioned description.

For example, the optical system shown in FIG. 1A and FIG. 1B, and FIG. 4A and FIG. 4B is that which uses a laser light at only one type of wavelength. However, it is possible to apply the present invention to an interchangeable optical pickup apparatus and optical disk apparatus for irradiating an optical disk with two or more types of wavelengths of a laser light. Furthermore, it is also possible to modify the optical system of the optical pickup apparatus to another configuration.

Furthermore, when transparent members are disposed in the spaces among the photodetectors, it is possible to integrate the three photodetectors together with the transparent members.

It is noted that in the above-described embodiments, although the case where a plurality of recording layers are disposed is assumed within a single disk. However, even when only a single recording layer is disposed within the single disk, it is possible to generate the stray light from a surface other than the recording layer. In this case also, when the present invention is used, it is possible to obtain the reproduced signal in which the influence resulting from the stray light is effectively inhibited.

Besides, the embodiment of the present invention may be modified in various ways, where appropriate, within the range of the technological idea set forth in the claims.

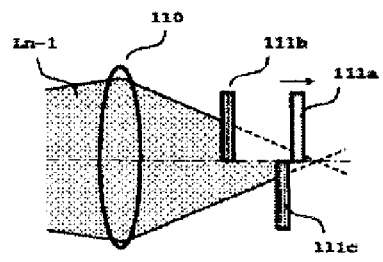
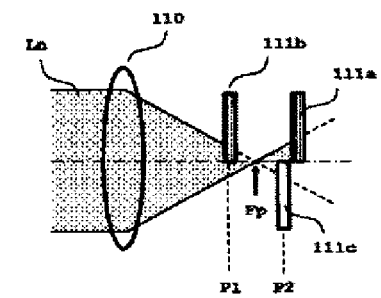
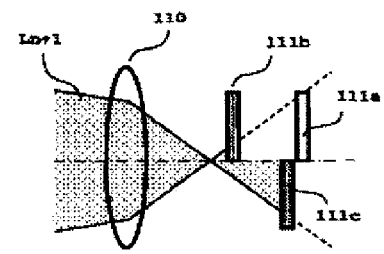

In the drawings, FIG. 13A-13C, the shading in features Ln-1,111b, and 111c should be added in FIG. 13A; the shading in features Ln, 111b, and 111a should be added in FIG. 13B; and the shading in features Ln+1, 111b, and 111c should be added in FIG. 13C:
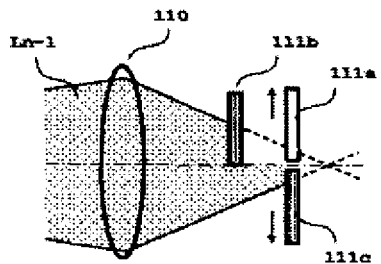
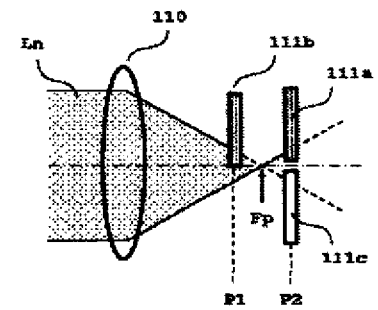
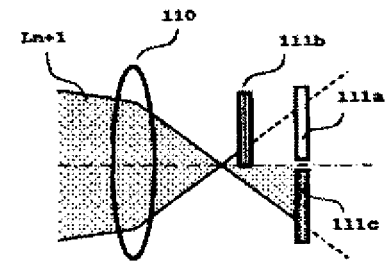

What is claimed is:

1. An optical pickup apparatus, comprising:
   a laser light source;
   an objective lens for converging a laser light emitted from the laser light source on a recording medium;
   a photodetecting section for receiving the laser light reflected by the recording medium; and
   an optical system for guiding the laser light emitted from the laser light source to the objective lens and also for guiding the laser light reflected by the recording medium to the photodetecting section as a convergent light,
   wherein the photodetecting section comprises:
   first and second photodetectors disposed at positions at which a first part of the target laser light and a second part different from the first part are respectively received, the positions being separated further from the optical system than a convergence position of a target laser light reflected by an irradiation-target recording layer, out of the laser light reflected by the recording medium, and a third photodetector disposed at a position closer to the optical system than the convergence position of the target laser light, the position being a position where the second part of the target laser light impinges upon the third photodetector.

2. The optical pickup apparatus according to claim 1, wherein the first part and the second part are parts obtained by splitting the target laser light into two in a direction vertical to an optical axis thereof, and the third photodetector is placed at a position bridging across a whole of the second part of the target laser light.

3. The optical pickup apparatus according to claim 2, wherein the third photodetector is placed at a position not bridging over the first part of the target laser light.

4. The optical pickup apparatus according to claim 1, wherein the optical system introduces astigmatism to the target laser light, the first, second and third photodetectors have a light-receiving region split into two in a direction orthogonal to a direction of alignment of the first and second photodetectors, and the optical system is adjusted so that a direction of the astigmatism is inclined by 45 degrees relative to the direction of alignment of the first and second photo detectors.

5. A signal generating method of generating a signal based on a target laser light reflected by an irradiation-target recording layer, out of a laser light which is reflected by a recording medium to be converged onto a photodetecting section, the method comprising steps of:
   placing first and second photodetectors at positions at which a first part of the target laser light and a second part different from the first part are respectively received, the positions being separated further from the recording medium than a convergence position of the target laser light, placing a third photodetector at a position closer to the recording medium than the convergence position of the target laser light, the position being a position where the third photodetector bridges more over the second part than the first part, and evaluating a signal S based on the target laser light by an arithmetic process of $S=S1+S3-S2$, where S1, S2, and S3 denote signals outputted from the first, second, and third photodetectors, respectively.

6. An optical disk apparatus, including:

an optical pickup apparatus; and a signal arithmetic circuit for performing an arithmetic process on a signal from the optical pickup apparatus, wherein the optical pickup apparatus comprises:

a laser light source;

an objective lens for converging a laser light emitted from the laser light source on an optical disk;

a photodetecting section for receiving the laser light reflected by the optical disk; and an optical system for guiding the laser light emitted from the laser light source to the objective lens and also for guiding the laser light reflected by the optical disk to the photodetecting section as a convergent light, the photodetecting section comprises:

first and second photodetectors disposed at positions at which a first part of the target laser light and a second part different from the first part are respectively received, the positions being separated further from the optical system than a convergence position of a target laser light reflected by an irradiation-target recording layer, out of the laser light reflected by the optical disk; and a third photodetector disposed at a position closer to the optical system than the convergence position of the target laser light, the position being a position where the third photodetector bridges more over the second part than the first part, and the signal arithmetic circuit evaluates a reproduced signal S based on the target laser light by an arithmetic process of $S=S1+S3-S2$, where S1, S2, and S3 denote signals outputted from the first, second, and third photodetectors, respectively.

* * * * *

UNITED STATES PATENT AND TRADEMARK OFFICE
CERTIFICATE OF CORRECTION

PATENT NO. : 8,203,917 B2
APPLICATION NO. : 12/471076
DATED : June 19, 2012
INVENTOR(S) : Yoshiyuki Matsumura It is certified that error appears in the above-identified patent and that said Letters Patent is hereby corrected as shown below:

On the title page, illustrative figure 2B should be substituted with the replacement figure 2B on attached page.

In the drawings, FIGS. 1A-1B, diagonal lines should be added above feature 106 in FIG. 1A; and the boxes at both ends of the "OPTICAL DISK 10" should be removed in FIG. 1B:

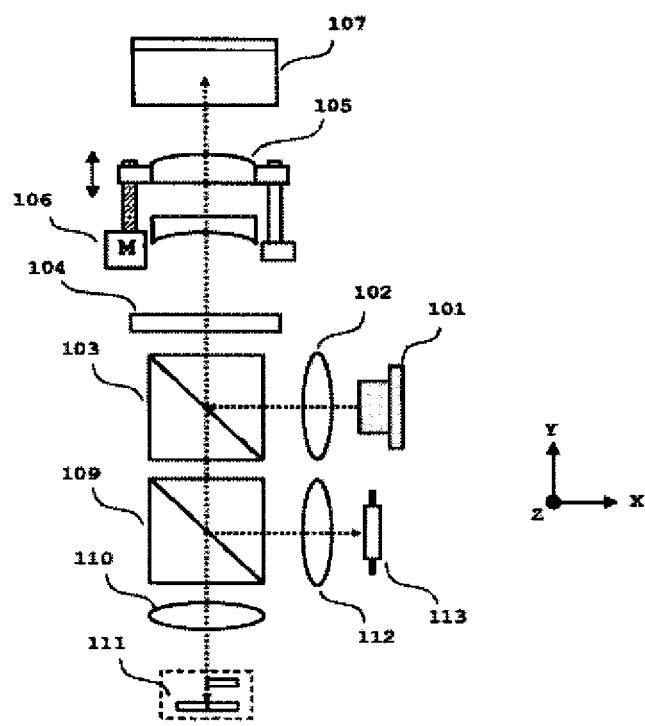
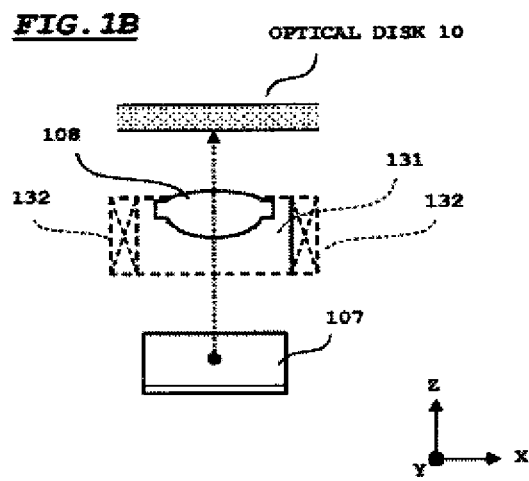

Signed and Sealed this
Fourth Day of December, 2012

David J. Kappos
*Director of the United States Patent and Trademark Office*

In the drawings, FIGS. 2A-2C, the shading in features Ln-1, 111b, and 111c should be added in FIG. 2A; the shading in features Ln, 111b, and 111a should be added in FIG. 2B; and the shading in features Ln+1, 111b, and 111c should be added in FIG. 2C:
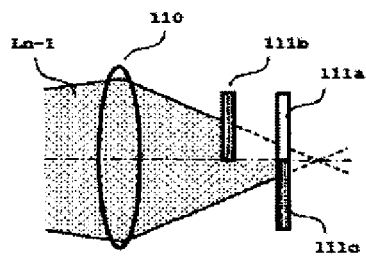
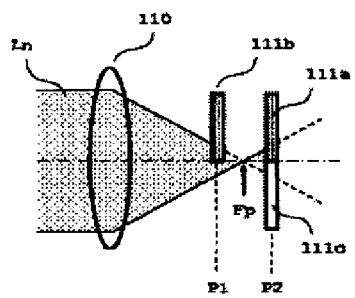
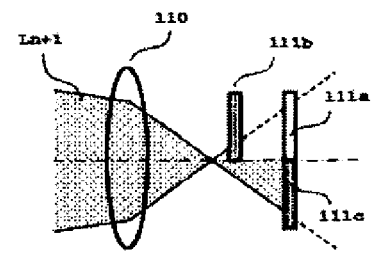
In the drawings, FIGS. 4A-4B, diagonal lines should be added above feature 106 in FIG. 4A; and the boxes at both ends of the "OPTICAL DISK 10" should be removed in FIG. 4B:
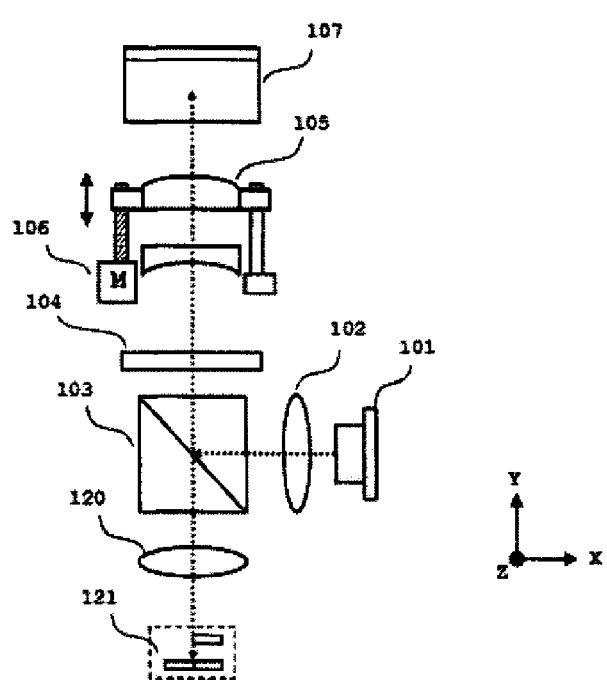
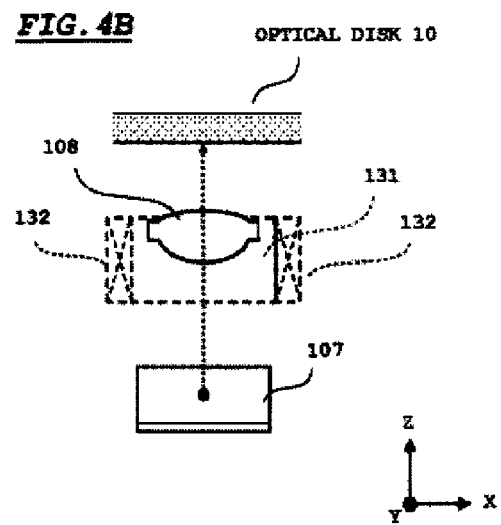

In the drawings, FIG. 6, the shading in features 121a, 121b, and/or 121c should be added in the left portions of each of the drawings, and the extraneous boxes in the right portions of each of the drawings should be removed:

*FIG. 6*

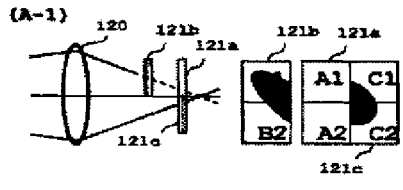
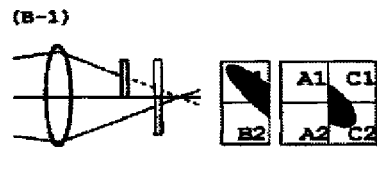
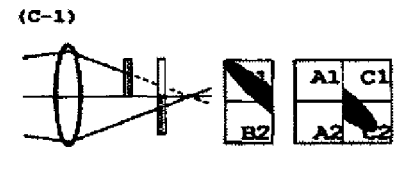
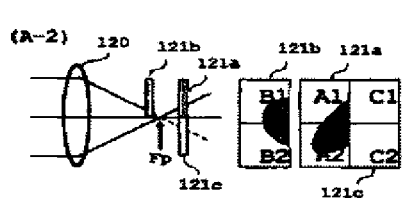
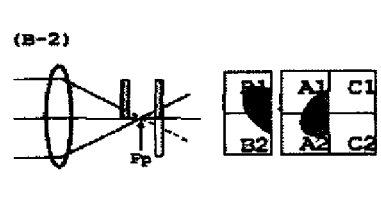
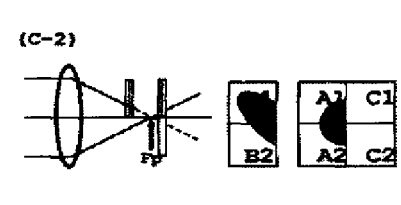
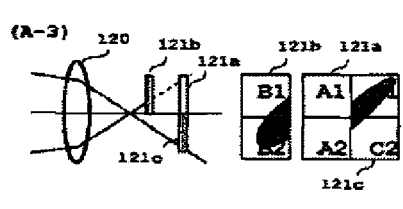
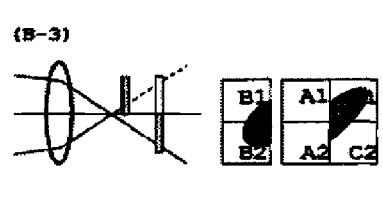
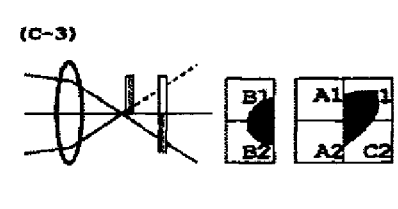

In the drawings, FIGS. 8A-8C, the shading in features Ln-1, 111b, and 111c should be added in FIG. 8A; the shading in features Ln, 111b, and 111a should be added in FIG. 8B; and the shading in features Ln+1, 111b, and 111c should be added in FIG. 8C:

*FIG. 8A*   *FIG. 8B*   *FIG. 8C*

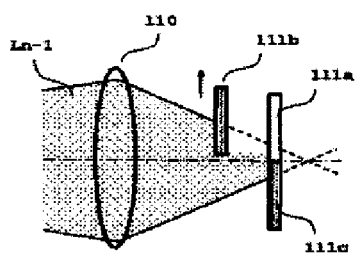
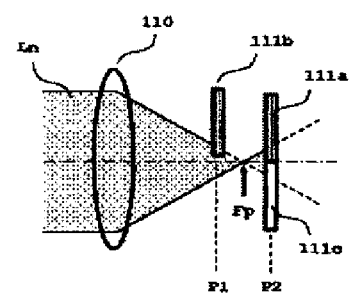
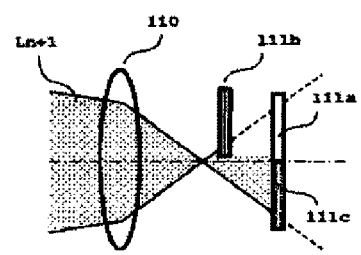

In the drawings, FIGS. 9A-9C, the shading in features Ln-1, 111b, and 111c should be added in FIG. 9A; the shading in features Ln, 111b, and 111a should be added in FIG. 9B; and the shading in features Ln+1, 111b, and 111c should be added in FIG. 9C:

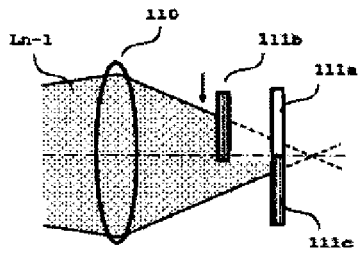
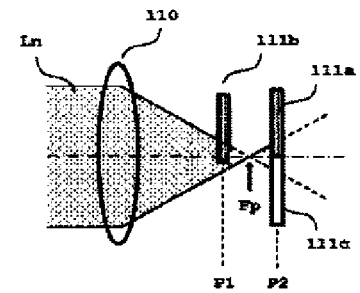
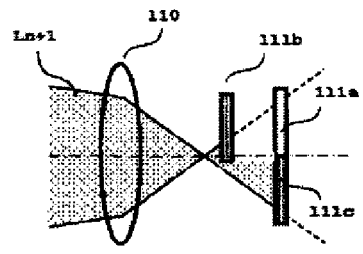

In the drawings, FIGS. 10A-10C, the shading in features Ln-1, 111b, and 111c should be added in FIG. 10A; the shading in features Ln, 111b, and 111a should be added in FIG. 10B; and the shading in features Ln+1, 111b, and 111c should be added in FIG. 10C:

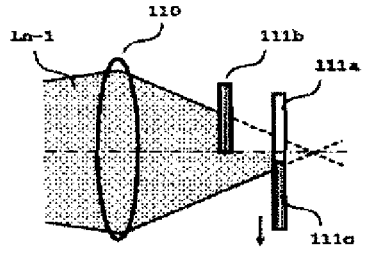
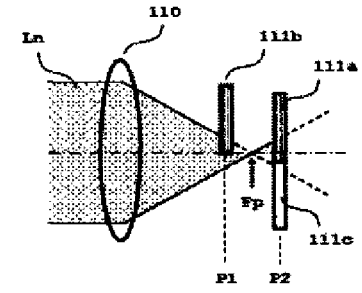
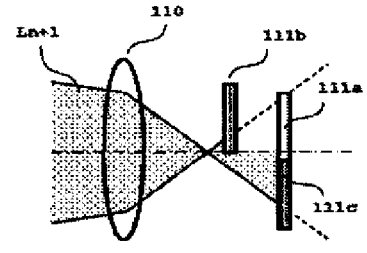

In the drawings, FIGS. 11A-11C, the shading in features Ln-1, 111b, and 111c should be added in FIG. 11A; the shading in features Ln, 111b, and 111a should be added in FIG. 11B; and the shading in features Ln+1, 111b, and 111c should be added in FIG. 11C:

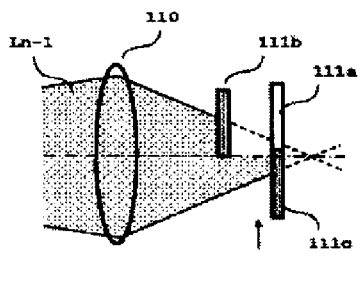
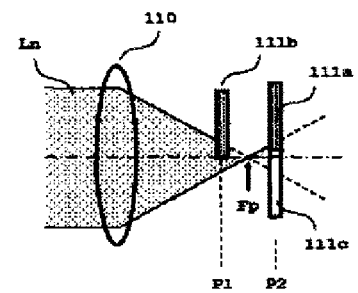
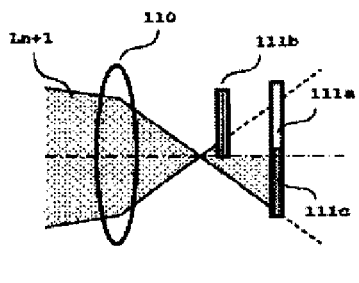

In the drawings, FIGS. 12A-12C, the shading in features Ln-1, 111b, and 111c should be added in FIG. 12A; the shading in features Ln, 111b, and 111a should be added in FIG. 12B; and the shading in features Ln+1, 111b, and 111c should be added in FIG. 12C: